(12) United States Patent
Yu et al.

(10) Patent No.: US 8,134,947 B2
(45) Date of Patent: Mar. 13, 2012

(54) COOPERATIVE RELAY METHOD AND SYSTEM IN MULTI-HOP RELAY NETWORK

(75) Inventors: Tak Ki Yu, Yongin-si (KR); Yung Soo Kim, Seongnam-si (KR); Sang Min Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 12/609,450

(22) Filed: Oct. 30, 2009

(65) Prior Publication Data

US 2010/0110969 A1    May 6, 2010

(30) Foreign Application Priority Data

Oct. 30, 2008 (KR) .................. 10-2008-0106934

(51) Int. Cl.
*H04B 7/216* (2006.01)
*H04L 12/56* (2006.01)

(52) U.S. Cl. .................. 370/315; 370/329; 370/347

(58) Field of Classification Search .................. 370/315, 370/329, 347
See application file for complete search history.

(56) References Cited

U.S. PATENT DOCUMENTS

2008/0045212 A1* 2/2008 Kim et al. .................. 455/435.1
* cited by examiner

*Primary Examiner* — John Pezzlo
(74) *Attorney, Agent, or Firm* — Jefferson IP Law, LLP

(57) ABSTRACT

A cooperative relay method and system in a multi-hop relay network are provided. The method may include receiving, at a first time slot, resource allocation information from a base station, and identifying a first hop Mobile Station (MS) data zone, receiving, at the first time slot, first hop MS data in the identified first hop MS data zone, and storing the received first hop MS data, and receiving, at a second time slot, second hop MS data from a relay station, and combining the first hop MS data with the second hop MS data. The resource allocation information may be an MS MAP indicating a first hop MS data zone, a simultaneous assignment MS MAP indicating both a first hop MS data zone and a second hop MS data zone, or a relay MAP indicating a first hop MS data zone.

10 Claims, 23 Drawing Sheets

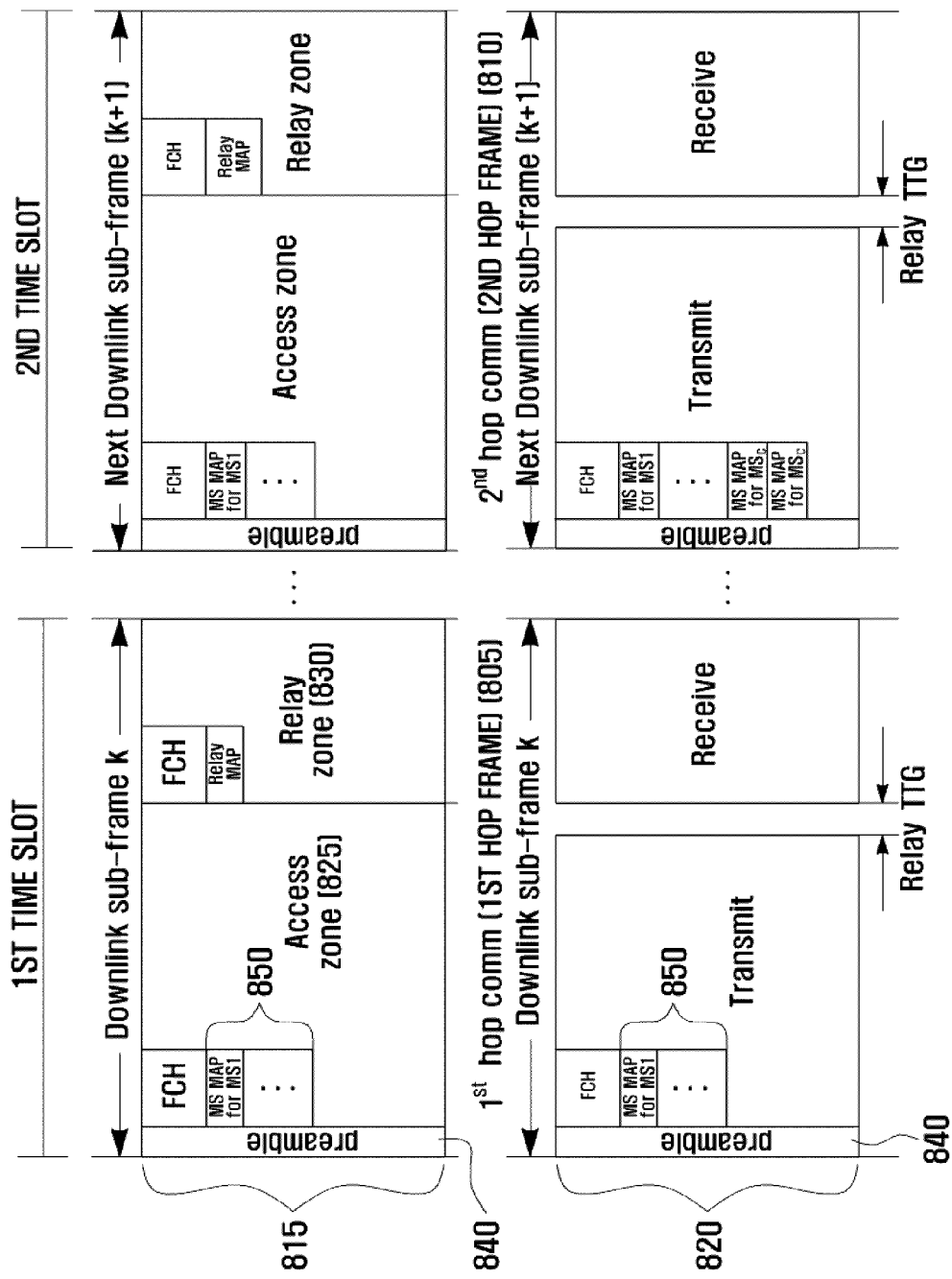

COOPERATIVE RELAY METHOD AND SYSTEM IN MULTI-HOP RELAY NETWORK

PRIORITY

This application claims the benefit under 35 U.S.C. §119 (a) of a Korean patent application filed in the Korean Intellectual Property Office on Oct. 30, 2008 and assigned Serial No. 10-2008-0106934, the entire disclosure of which is hereby incorporated by reference.

BACKGROUND OF THE INVENTION

1. Field of the Invention

The present invention relates to cooperative relaying in a multi-hop relay network. More particularly, the present invention relates to a method and system for cooperative relaying in a multi-hop relay network wherein a Mobile Station (MS) can enhance reception performance by receiving and decoding signals from both a relay link of a Base Station (BS) and an access link of a Relay Station (RS).

2. Description of the Related Art

In next generation mobile communications, Relay Stations (RSs) will be deployed to cover heterogeneous service areas rather than Base Stations (BSs). The RSs may contribute to coverage area extension and capacity enlargement. Unlike analog and digital repeaters employed in existing cellular systems, relay systems enable radio resource management in consideration of situations related to interference and resources. This makes it possible to secure better links for capacity enhancement, and to provide acceptable services to mobile stations located in shadow areas for coverage extension.

To enhance reception performance of mobile stations in relay networks, cooperative relaying, where RSs and BSs cooperate for transmissions, has been proposed. Cooperative relaying has been adopted by the IEEE 802.16j standard.

In existing schemes for cooperative relaying, for access link transmission at the second hop, a BS performs simultaneous transmission to enhance reception performance of a Mobile Station (MS). However, although the MS may receive a signal of an acceptable level from the BS, the MS may not utilize information of a relay link signal at the first hop. Further, in a network having multiple RSs, to provide a cooperative relay service to multiple RSs or multiple MSs, the BS may have to utilize separate resources, excluding resource reuse gain.

Accordingly, it is necessary to develop a scheme for cooperative relaying that utilizes both a relay link signal at a first hop and an access link signal at a second hop.

SUMMARY OF THE INVENTION

An aspect of the present invention is to address at least the above-mentioned problems and/or disadvantages and to provide at least the advantages described below. Accordingly, an aspect of the present invention is to provide a method and system for cooperative relaying wherein a Mobile Station (MS) can enhance reception performance by receiving and decoding both a relay link signal from a Base Station (BS) and an access link signal from a Relay Station (RS).

The present invention also provides a signaling method and frame structure that enable an MS to receive both a relay link signal and an access link signal.

In accordance with an exemplary embodiment of the present invention, a cooperative relay method in a multi-hop relay network is provided. The method includes receiving, at a first time slot, resource allocation information from a base station, and identifying a first hop MS data zone, receiving, at the first time slot, first hop MS data in the identified first hop MS data zone, and storing the received first hop MS data, and receiving, at a second time slot, second hop MS data from a relay station, and combining the first hop MS data with the second hop MS data.

In accordance with another exemplary embodiment of the present invention, a cooperative relay method in a multi-hop relay network is provided. The method includes receiving, at a first time slot, a first hop BS frame from a base station, and storing the received first hop BS frame, receiving, at a second time slot, resource allocation information from a relay station, and identifying a data zone, obtaining, at the second time slot, first hop MS data in the identified data zone of the stored first hop BS frame, and receiving, at the second time slot, second hop MS data from the relay station, and combining the first hop MS data with the second hop MS data.

In accordance with still another exemplary embodiment of the present invention, a cooperative relay method in a multi-hop relay network is provided. The method includes receiving, by a relay station at a zeroth time slot, a relay MAP containing information as to a first hop MS data zone from a base station, examining, by the relay station at a first time slot, the information as to the first hop MS data zone, and transmitting resource allocation information as to first hop MS data to a mobile station, identifying, by the mobile station at the first time slot, the first hop MS data zone on the basis of the resource allocation information from the relay station, receiving, by the mobile station at the first time slot, the first hop MS data in the identified first hop MS data zone, and storing the received first hop MS data, and receiving, by the mobile station at a second time slot, second hop MS data from the relay station, and combining the first hop MS data with the second hop MS data.

In accordance with still another exemplary embodiment of the present invention, a cooperative relay system in a multi-hop relay network is provided. The system includes a base station for transmitting resource allocation information containing information as to a first hop MS data zone at a first time slot, a relay station for transmitting second hop MS data at a second time slot, and a mobile station for examining the resource allocation information and for receiving first hop MS data at the first time slot, and for receiving second hop MS data and for combining the first hop MS data with the second hop MS data at the second time slot.

In accordance with yet another exemplary embodiment of the present invention, a cooperative relay system in a multi-hop relay network is provided. The system includes a base station for transmitting a first hop BS frame containing first hop MS data at a first time slot, a relay station for transmitting second hop MS data and resource allocation information at a second time slot, and a mobile station for receiving, at the first time, the first hop BS frame and for storing the first hop BS frame, for receiving, at the second time slot, the resource allocation information, for identifying a data zone, and for obtaining the first hop MS data in the identified data zone of the first hop BS frame.

In accordance with still another exemplary embodiment of the present invention, a cooperative relay system in a multi-hop relay network is provided. The system includes a base station for transmitting a sliding MAP frame containing information as to a first hop MS data zone at a zeroth time slot, a relay station for examining the information as to the first hop MS data zone in the sliding MAP frame at the zeroth time slot, and for transmitting resource allocation information as to first hop MS data at a first time slot, and a mobile station for examining the resource allocation information and for receiving the first hop MS data at the first time slot, and for receiving second hop MS data and for combining the first hop MS data with the second hop MS data at the second time slot.

In a feature of the present invention, the cooperative relay method enables a mobile station to receive and decode both a relay link signal from the base station and an access link signal from the relay station, thereby enhancing reception performance.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 illustrates a structure of frames sent and received between a BS, an RS, and an MS in a nontransparent relay mode according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
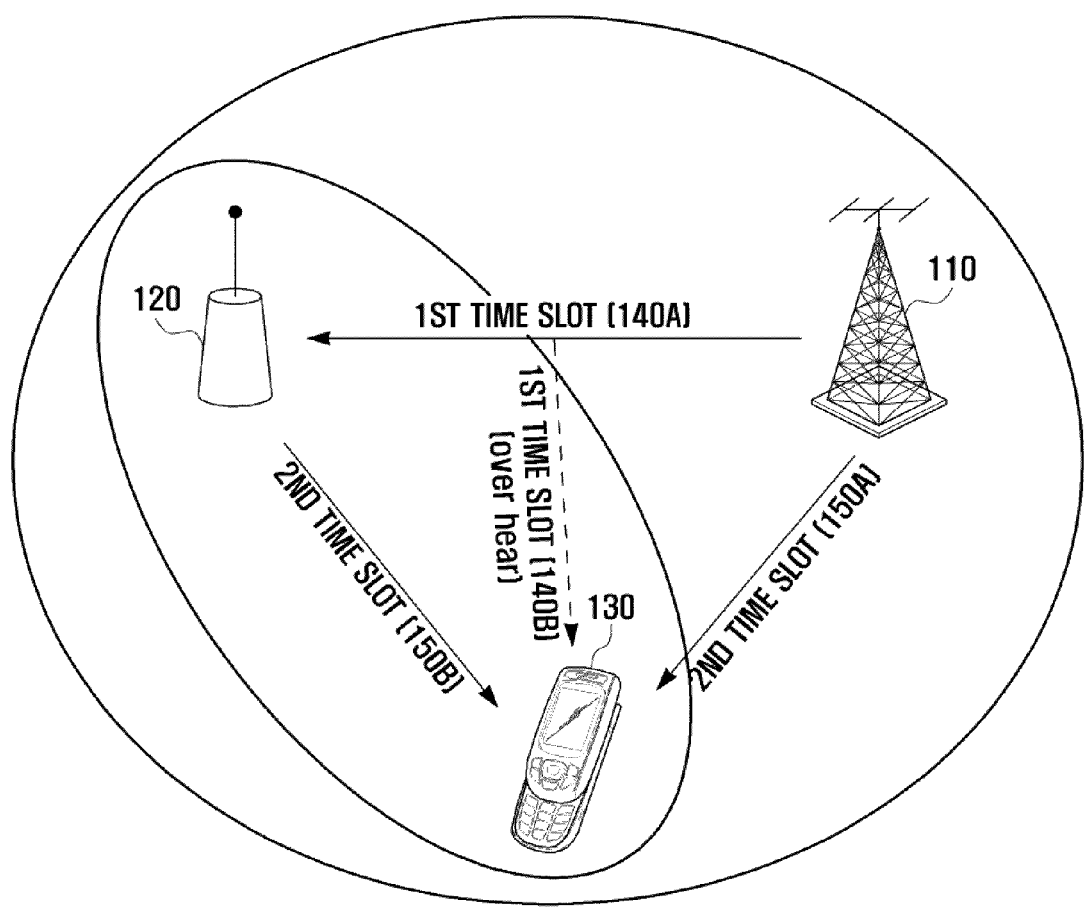
FIG. 1 is a block diagram of a system providing a cooperative relay service in a multi-hop relay network according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used in the description is based on the IEEE 802.16j standard. However, the present invention is not limited thereto.

A zeroth time slot, a first time slot, and a second time slot are determined by a sequence of signal transmissions by a Base Station (BS), a Relay Station (RS), or a Mobile Station (MS).

First hop MS data is sent and received at the first time slot, and is related to MSs receiving a cooperative relay service. Second hop MS data is sent and received at the second time slot, and is related to MSs receiving a cooperative relay service.

A first hop frame indicates a frame that is sent and received at the first time slot, and a second hop frame indicates a frame that is sent and received at the second time slot.

First hop frames may be grouped by a sender into first hop BS frames and first hop RS frames. Similarly, second hop frames may be grouped by a sender into second hop BS frames and second hop RS frames.

Resource allocation information may be denoted by MAP. A relay MAP (RS MAP) is resource allocation information as to signal resources received by an RS from a BS. An MS MAP is resource allocation information as to signal resources received by an MS from a BS or an RS.

Exemplary embodiments of the present invention are applicable to multi-hop cases including multiple RSs. For the purpose of description, a two-hop case including a single RS is depicted as an example. A person skilled in the art would readily appreciate that cooperative relaying in a two-hop case is applicable to a multi-hop case.

In a multi-hop relay network, an RS may operate in a transparent mode or nontransparent mode. In the transparent mode, the RS does not send control information to an MS, and the MS directly receives control information from a BS. In the nontransparent mode, the RS directly sends control information to an MS.

In the following description, three exemplary embodiments of the cooperative relay method of the present invention are depicted. In a first exemplary embodiment, the RS operates in the transparent mode. In a second exemplary embodiment, the RS operates in the nontransparent mode. In a third exemplary embodiment, the RS operates in the nontransparent mode, and the BS additionally transmits a sliding MAP frame.

The MS of exemplary embodiments of the present invention has to obtain resource allocation information indicating the zone allocated for MS data in a relay link signal. The BS or RS may transmit resource allocation information to the MS by the use of one of three schemes (type A scheme, type B scheme and type C scheme). The type A scheme uses a separate MS MAP to indicate an MS data zone. The type B scheme uses a simultaneous assignment MS MAP to indicate both an MS data zone in a relay link signal and an MS data zone in an access link signal. The type C scheme assigns an MS data zone in a relay MAP allocated to an RS serving the MS.

In the following description, each exemplary embodiment is described from the viewpoints of the type A, B and C schemes assigning an MS data zone.

FIG. 1 is a block diagram of a system providing a cooperative relay service in a multi-hop relay network according to an exemplary embodiment of the present invention. FIG. 1 depicts a basic concept applicable to exemplary embodiments of the present invention. Hence, the technical configuration of one exemplary embodiment may be different from that of another exemplary embodiment.

Referring to FIG. 1, the cooperative relay system includes a BS 110, an RS 120, and an MS 130. In the drawings, reference symbol MSc denotes the MS 130 that receives a cooperative relay service.

The BS 110 is a Multi-hop Relay BS (MR-BS). The BS 110 transmits a first hop BS frame at the first time slot 140A or 140B, and transmits a second hop BS frame at the second time slot 150A. The BS 110 sends resource allocation information according to the type A, B or C scheme by the use of a first hop BS frame and second hop BS frame. The procedure used by the BS 110 to send resource allocation information is explained in more detail later.

The RS 120 receives the first hop BS frame from the BS 110 at the first time slot 140A. The RS 120 extracts first hop MS data, decodes the extracted first hop MS data and re-encodes the decoded first hop MS data. At the second time slot 150B, the RS 120 transmits a second hop RS frame, containing second hop MS data (re-encoded first hop MS data), to the mobile station 130. The RS 120 forwards an assignment indication to an MS data zone allocated by the BS 110 or directly assigns an MS data zone according to the type A, B or C scheme. This is detailed later.

The MS 130 receives the first hop BS frame from the BS 110 at the first time slot 140B. The MS 130 obtains first hop MS data utilizing resource allocation information collected at the first time slot 140B, and temporarily stores the first hop MS data. At the second time slot 150A or 150B, the MS 130 receives a second hop BS frame from the BS 110 and a second hop RS frame from the RS 120, and obtains second hop MS data. The MS 130 combines the first hop MS data obtained at the first time slot 140B with the second hop MS data obtained at the second time slot 150B, and decodes the combined MS data.

<Transparent Relay Mode>

Next, a description is given of an exemplary embodiment in which the RS 120 operates in the transparent mode. In this case, the MS 130 directly receives control information from the BS 110.

Figure 2:
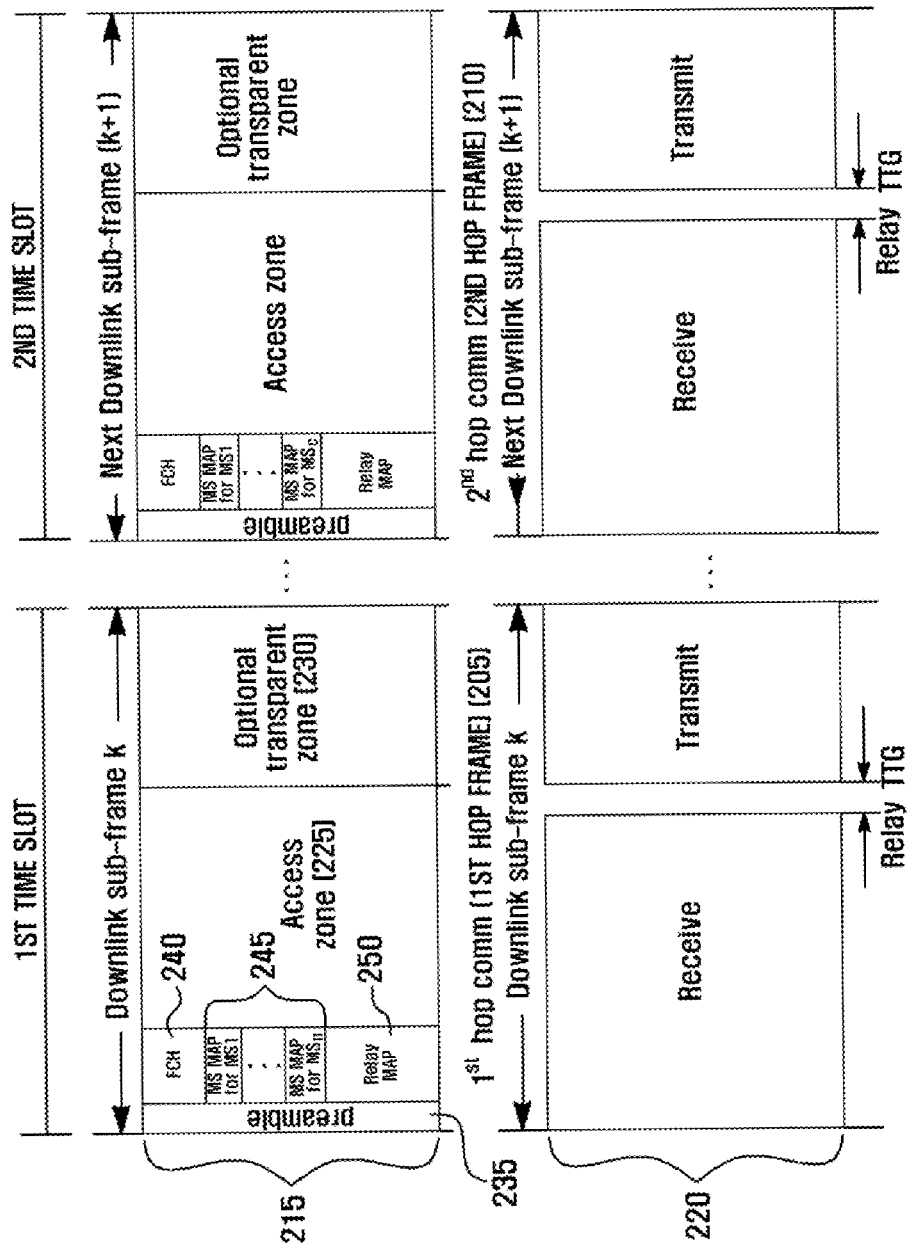
FIG. 2 illustrates a structure of frames sent and received between a Base Station (BS), a Relay Station (RS), and a Mobile Station (MS) in a transparent relay mode according to an exemplary embodiment of the present invention.

FIG. 2 illustrates a structure of frames sent and received between a BS 110, an RS 120, and an MS 130 in a transparent relay mode according to an exemplary embodiment of the present invention. The structure of frames in FIG. 2 commonly applies to the type A, B and C schemes in the transparent relay mode.

Referring to FIG. 2, frames in the transparent mode may be divided into a first hop frame 205 transmitted at the first time slot and a second hop frame 210 transmitted at the second time slot. Here, the "first hop frame" and "second hop frame" are named with respect to a piece of packet data being sent to the MS, and indicate whether particular packet data is transmitted at a first hop interval or at a second hop interval. That is, one packet data may correspond to a first hop frame, and another packet data may correspond to a second hop frame. As the MS continuously receives data, each frame may be a first hop frame or a second hop frame according to a corresponding packet. In the specification, the description is given with reference to a particular packet being relayed, and the first frame of a packet is referred to as a first hop frame and the second frame thereof is referred to as a second hop frame.

Frames in the transparent mode may be divided by the sender into a BS frame 215 and an RS frame 220. For example, a frame sent by a BS at the first time slot may be termed a first hop BS frame.

Each frame in FIG. 2 is split into a downlink sub-frame and an uplink sub-frame. For ease of description, only downlink sub-frames are depicted.

A downlink sub-frame may include an access zone 225 used by the BS 110 to communicate with the RS 120 or MS 130, and a transparent zone 230 used by the RS 120 to communicate with the MS 130. The RS 120 receives data from the BS 110 through the access zone 225, and forwards the received data to the MS 130 through the transparent zone 230.

The downlink sub-frame starts with a preamble 235. The preamble 235 is used for downlink time and frequency synchronization of the MS 130. The preamble 235 is followed by a Frame Control Header (FCH) 240. The FCH 240 is a header of a MAP indicating structures of user data, and includes information regarding the structure of the MAP.

The FCH 240 is followed by one or more MS MAPs 245 and a relay MAP 250. An MS MAP 245 and relay MAP 250 contain resource allocation information as to corresponding MS data and RS data. That is, after reception of a MAP, an MS or RS can identify a resource zone allocated to the data addressed thereto.

Figure 3:
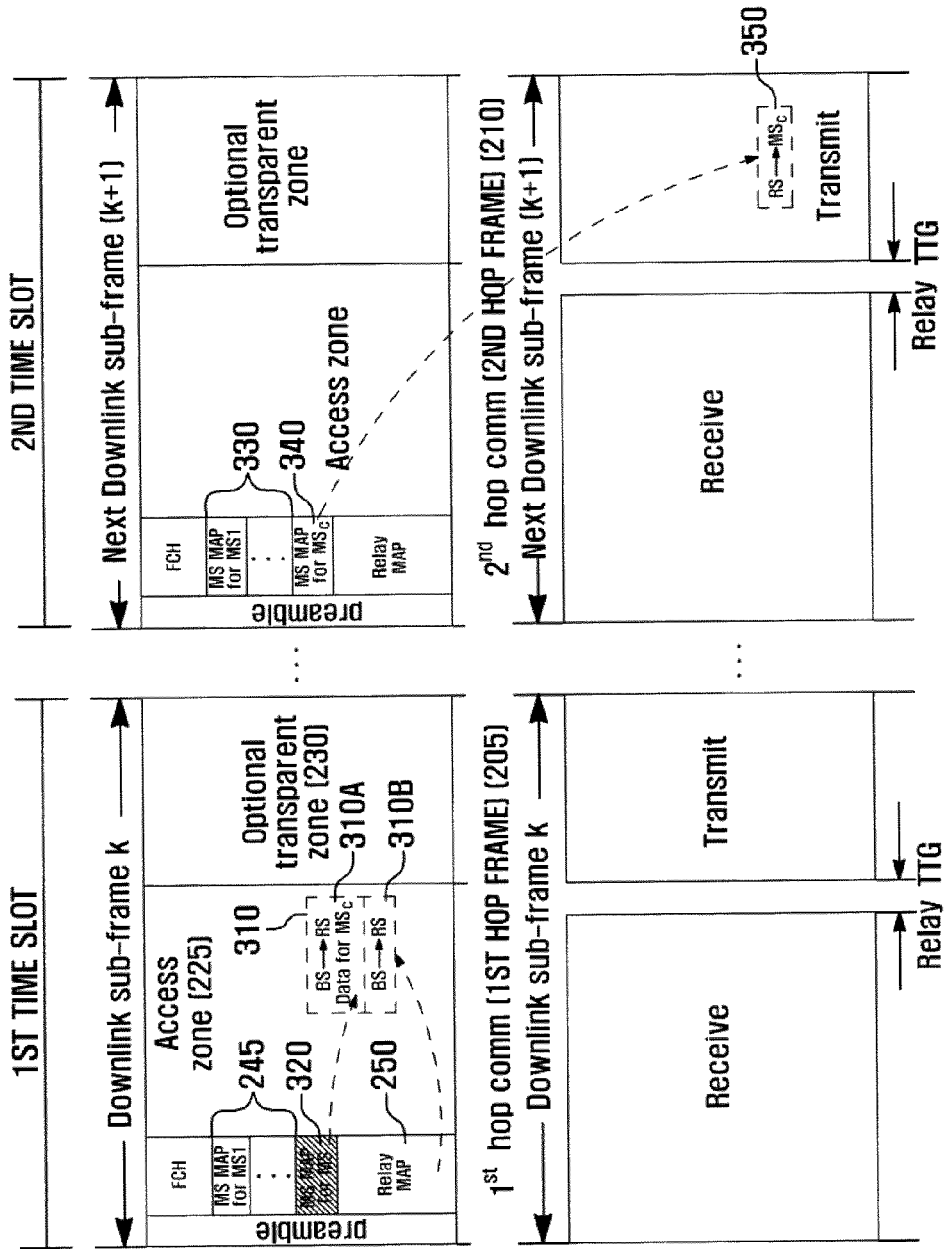
FIG. 3 illustrates a structure of frames and a type A scheme for a BS transmitting resource allocation information using a separate MS MAP in a transparent relay mode according to an exemplary embodiment of the present invention.

FIG. 3 illustrates a structure of frames and a type A scheme for a BS transmitting resource allocation information using a separate MS MAP in a transparent relay mode according to an exemplary embodiment of the present invention.

First Time Slot (Type A)

The existing specification provides that the first hop BS frame at the first time slot is received by the RS 120. When finding a relay MAP 250 in the received first hop BS frame, the RS 120 obtains resource allocation information as to RS data transmitted from the BS 110 to the RS 120.

On the other hand, in an exemplary implementation, the first hop BS frame transmitted by the BS 110 at the first time slot may be received by not only the RS 120 but also the MS 130 receiving a cooperative relay service. In this case, resource allocation information of the first hop BS frame includes a regular MS MAP 245 allocated to a regular MS not receiving a cooperative relay service, a separate MS MAP 320 allocated to an MS receiving a cooperative relay service, and the relay MAP 250 allocated to an RS. In addition, the RS data zone 310 for the RS includes a zone 310A for first hop MS data related to the MS receiving a cooperative relay service, and a zone 310B for MS data related to the MS not receiving a cooperative relay service.

The BS 110 assigns a separate MS MAP 320 in the first hop BS frame to the MS 130. The MS 130 then checks the MS data zone 310A in the first hop BS frame, and can obtain first hop MS data.

The RS 120 examines the RS data zone 310 on the basis of the corresponding relay MAP 250, obtains first hop MS data, and re-encodes the obtained first hop MS data into second hop MS data.

In summary, an existing MS is unable to examine a zone for first hop MS data in the first hop BS frame. Hence, although the existing MS can receive a first hop BS frame of an acceptable level, it may be unable to utilize the first hop BS frame. On the other hand, in an exemplary implementation, the BS 110 inserts resource allocation information (e.g., a separate MS MAP 320) indicating an MS data zone in the first hop BS frame. The MS 130 can refer to the separate MS MAP 320 in the first hop BS frame to find the corresponding MS data zone, and obtain first hop MS data.

Second Time Slot (Type A)

At the second time slot, the BS 110 transmits a second hop BS frame. The BS 110 inserts MS MAPs for second hop resources in the second hop BS frame. The MS MAPs include an MS MAP 330 assigned to an MS not receiving a cooperative relay service, and an MS MAP 340 assigned to an MS receiving a cooperative relay service.

The RS 120 receives the second hop BS frame from the BS 110. The RS 120 refers to the MS MAP 340 in the received second hop BS frame, and finds a corresponding MS data zone 350 in the second hop RS frame. The RS 120 transmits the second hop MS data (re-encoded first hop MS data) to the MS 130 by inserting the second hop MS data in the MS data zone 350 of the second hop RS frame.

At the second time slot, the MS 130 receives the second hop BS frame from the BS 110, and refers to the MS MAP 340 to identify the corresponding MS data zone. The MS 130 obtains second hop MS data from the identified MS data zone.

Thereafter, the MS 130 combines the first hop MS data obtained in the first time slot with the second hop MS data, and decodes the combined MS data.

Figure 4:
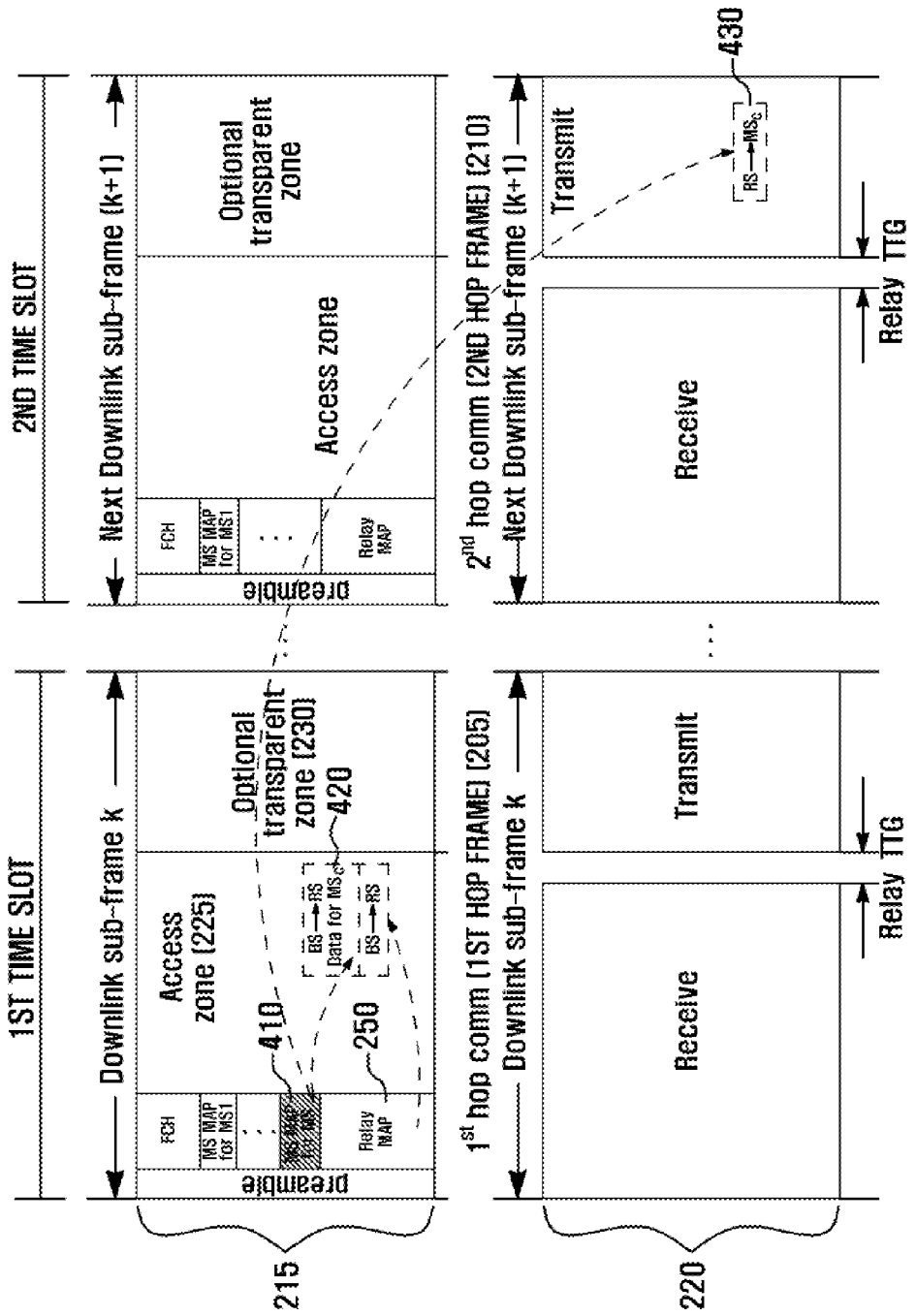
FIG. 4 illustrates a structure of frames and a type B scheme for a BS transmitting resource allocation information using a simultaneous assignment MS MAP in a transparent relay mode according to an exemplary embodiment of the present invention.

FIG. 4 illustrates a structure of frames and a type B scheme for a BS 110 transmitting resource allocation information using a simultaneous assignment MS MAP in a transparent relay mode according to an exemplary embodiment of the present invention.

First Time Slot (Type B)

The BS 110 allocates a simultaneous assignment MS MAP 410 in the first hop BS frame to an MS 130 receiving a cooperative relay service. The simultaneous assignment MS MAP 410 contains information regarding both a first hop MS data zone in the first hop frame and a second hop MS data zone in the second hop frame. That is, the MS MAP 410 contains two pieces of resource allocation information.

The MS 130 obtains information regarding both the first hop MS data zone 420 and the second hop MS data zone 430 with reference to the simultaneous assignment MS MAP 410. The MS 130 obtains first hop MS data from the first hop MS data zone 420 at the first time slot.

The RS 120 obtains the simultaneous assignment MS MAP 410 from the first hop BS frame. The RS 120 may obtain information regarding both the first hop MS data zone 420 in the first hop frame and the second hop MS data zone 430. The RS 120 obtains first hop MS data from the first hop MS data zone 420, and re-encodes the obtained first hop MS data.

Second Time Slot (Type B)

At the second time slot, the BS 110 does not transmit resource allocation information to the RS 120 and MS 130. This is because resource allocation information for the second hop frame has already been transmitted through the first hop frame.

The RS 120 transmits the re-encoded first hop MS data to the MS 130 by inserting the re-encoded first hop MS data in the MS data zone 430 of the second hop RS frame.

The MS 130 receives the second hop RS frame from the RS 120. The MS 130 uses information as to the second hop MS data zone 430 obtained at the first time slot to obtain second hop MS data.

Figure 5:
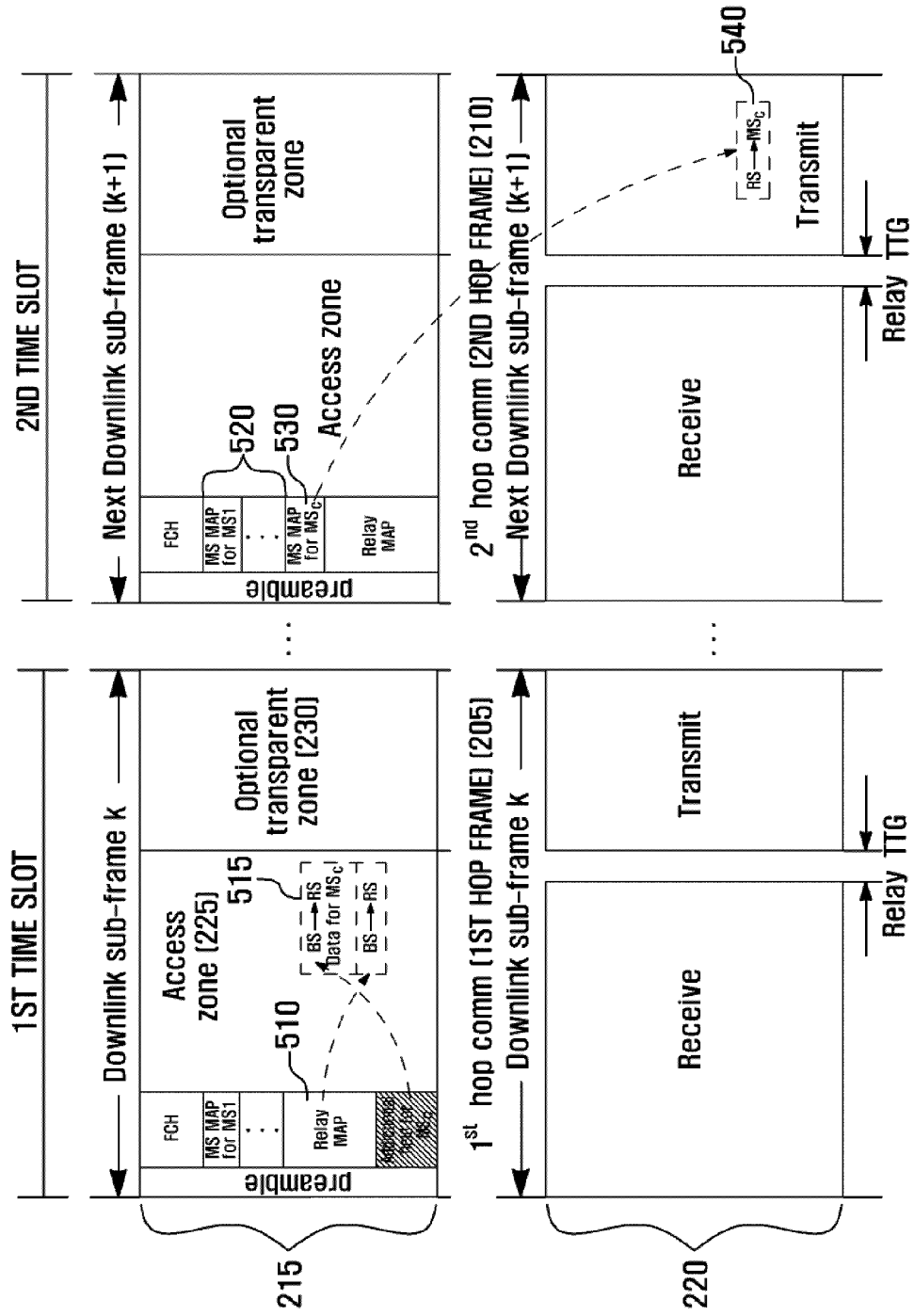
FIG. 5 illustrates a structure of frames and a type C scheme for a BS for transmitting resource allocation information using a relay MAP in a transparent relay mode according to an exemplary embodiment of the present invention.

FIG. 5 illustrates a structure of frames and a type C scheme for a BS 110 transmitting resource allocation information using a relay MAP in a transparent relay mode according to an exemplary embodiment of the present invention.

First Time Slot (Type C)

At the first time slot, the BS 110 allocates a relay MAP 510 indicating a zone for first hop MS data in the first hop BS frame.

When the first hop BS frame is received, the MS 130 identifies the relay MAP 510 associated with the serving RS 120. On the basis of the identified relay MAP 510, the MS 130 obtains information regarding the first hop MS data zone 515. The MS 130 obtains first hop MS data from the first hop MS data zone 515.

The RS 120 identifies the location of its data through the relay MAP 510, extracts first hop MS data, and re-encodes the extracted first hop MS data.

Second Time Slot (Type C)

At the second time slot, the BS 110 transmits a second hop BS frame. The BS 110 inserts MS MAPs for second hop resources in the second hop BS frame. The MS MAPs include an MS MAP 520 assigned to an MS not receiving a cooperative relay service, and an MS MAP 530 assigned to an MS receiving a cooperative relay service.

The RS 120 receives the second hop BS frame from the BS 110. The RS 120 refers to the MS MAP 530 in the received second hop BS frame, and finds a corresponding MS data zone 540 in the second hop RS frame. The RS 120 transmits the re-encoded first hop MS data to the MS 130 by inserting the re-encoded first hop MS data in the MS data zone 540 of the second hop RS frame.

At the second time slot, the MS 130 receives the second hop BS frame from the BS 110, and refers to the MS MAP 530 to identify the corresponding MS data zone. The MS 130 receives a second hop RS frame from the RS 120, and obtains second hop MS data from the identified MS data zone.

Thereafter, the MS 130 combines the first hop MS data obtained in the first time slot with the second hop MS data obtained in the second time slot, and decodes the combined MS data.

Figure 6A:
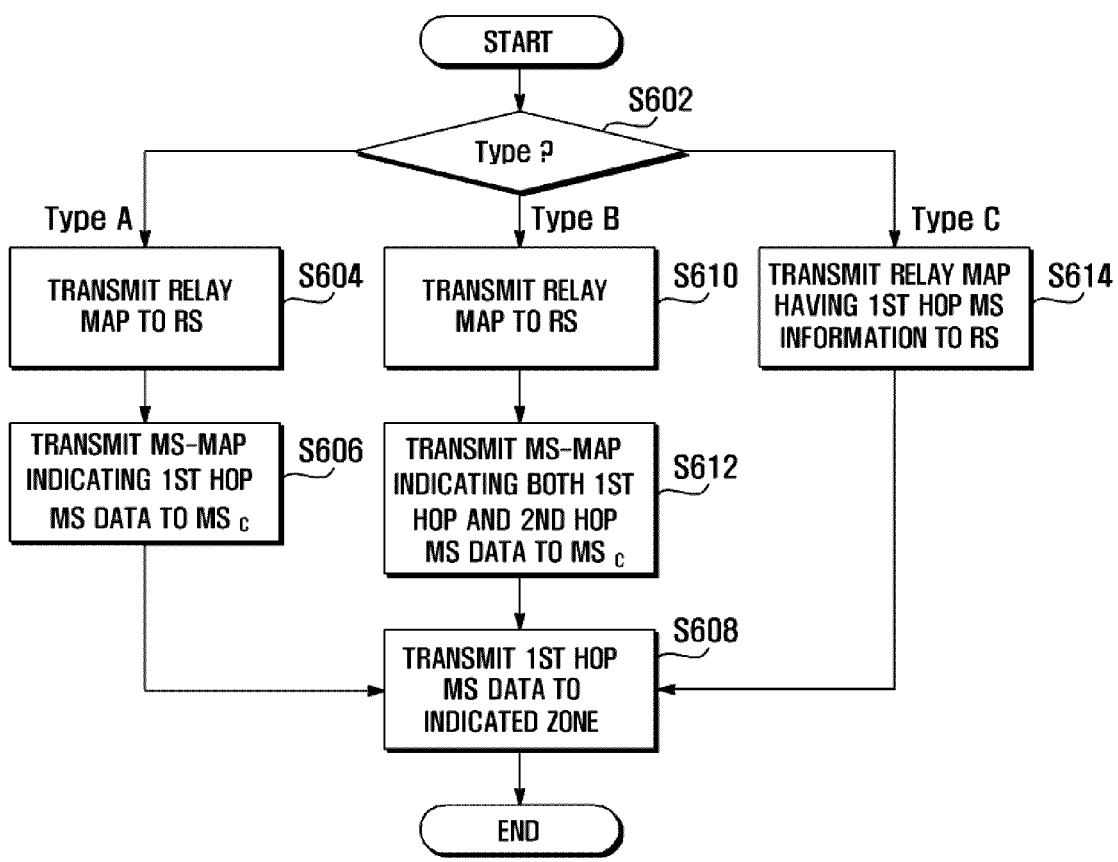
FIGS. 6A, 6B and 6C are flowcharts illustrating procedures for processing resource allocation information performed respectively by a BS, an RS, and an MS at a first time slot in a transparent relay mode according to an exemplary embodiment of the present invention.
Figure 6B:
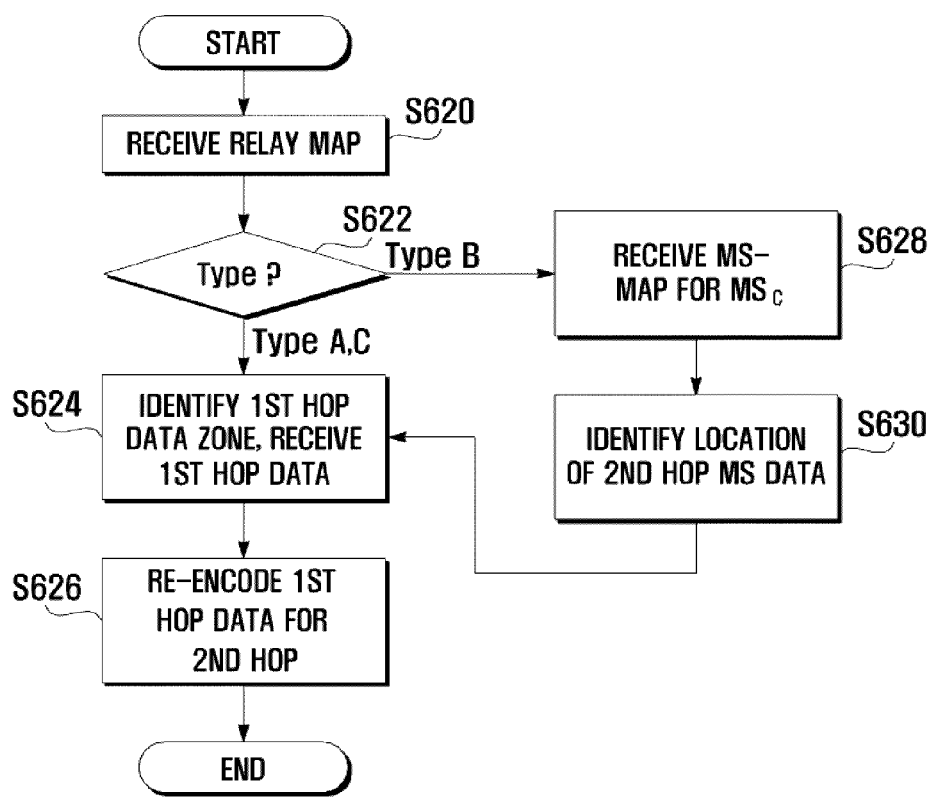
Figure 6C:
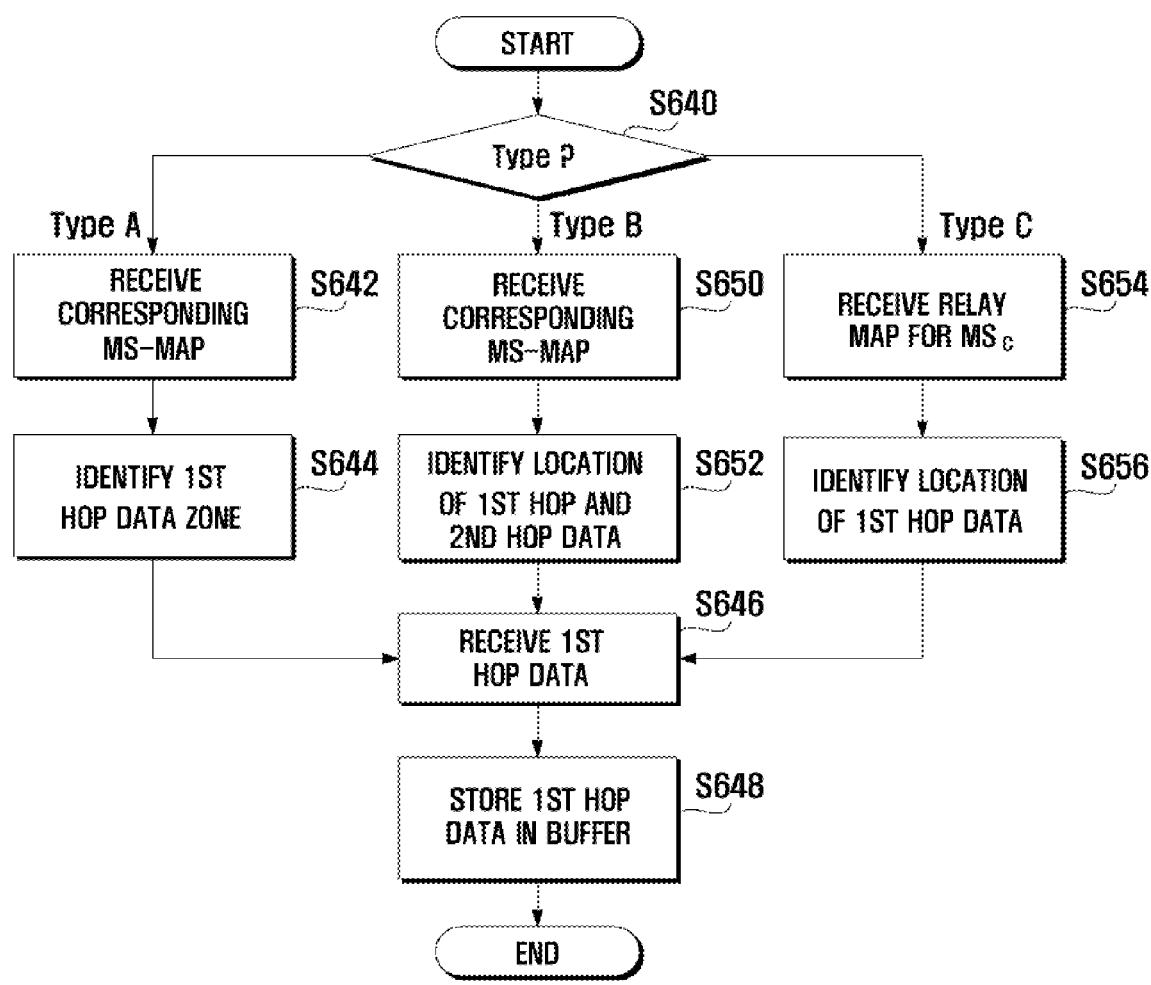

FIGS. 6A, 6B and 6C are flowcharts illustrating procedures for processing resource allocation information performed respectively by a BS 110, an RS 120, and an MS 130 at a first time slot in a transparent relay mode according to an exemplary embodiment of the present invention.

FIG. 6A is a flowchart illustrating a procedure for a BS 110 at a first time slot in a transparent relay mode according to an exemplary embodiment of the present invention.

Referring to FIG. 6A, the BS 110 determines the type of scheme for transmitting resource allocation information in step S602.

If it is determined that the scheme is type A, the BS 110 transmits a relay MAP indicating RS data allocation by allocating the relay MAP in a first hop BS frame in step S604. Here, the relay MAP includes resource allocation information as to MS data for both an MS receiving a cooperative relay service and an MS not receiving a cooperative relay service.

The BS 110 transmits a separate MS MAP 320 indicating first hop MS data allocation by allocating the separate MS MAP 320 in the first hop BS frame in step S606. The BS 110 transmits first hop MS data in the zone indicated by the separate MS MAP 320 in step S608.

If it is determined that the scheme is type B, the BS 110 transmits a relay MAP indicating RS data allocation by allocating the relay MAP in a first hop BS frame in step S610. The BS 110 transmits a simultaneous assignment MS MAP 410 indicating both first hop MS data allocation and second hop MS data allocation by allocating the simultaneous assignment MS MAP 410 in the first hop BS frame in step S612. The BS 110 transmits first hop MS data in the zone indicated by the MS MAP 410 in step S608.

If it is determined that the scheme is type C, the BS 110 transmits a relay MAP 510 containing information on first hop MS data allocation by allocating the relay MAP 510 in a first hop BS frame in step S614. The BS 110 transmits first hop MS data in the zone indicated by the relay MAP 510 in step S608.

FIG. 6B is a flowchart illustrating a procedure for an RS 120 at a first time slot in a transparent relay mode according to an exemplary embodiment of the present invention.

Referring to FIG. 6B, the RS 120 receives a corresponding relay MAP in the first hop BS frame from the BS 110 in step S620. The RS 120 determines the type of scheme for transmitting resource allocation information in step S622.

If it is determined that the scheme is type A or type C, the RS 120 identifies an RS data zone on the basis of the relay MAP, and receives first hop MS data in step S624. The RS 120 re-encodes the first hop MS data into second hop MS data in step S626.

In contrast, if it is determined that the scheme is type B, the RS 120 receives a simultaneous assignment MS MAP 410 in the first hop BS frame in step S628. The simultaneous assignment MS MAP 410 indicates both first hop MS data allocation and second hop MS data allocation. The RS 120 identifies the location of the second hop MS data zone in step S630. The RS 120 identifies an RS data zone on the basis of the relay MAP, and receives first hop MS data in step S624. The RS 120 re-encodes the first hop MS data into second hop MS data in step S626.

FIG. 6C is a flowchart illustrating a procedure for an MS 130 at a first time slot in a transparent relay mode according to an exemplary embodiment of the present invention.

Referring to FIG. 6C, the MS 130 determines the type of scheme for transmitting resource allocation information in step S640.

If it is determined that the scheme is type A, the MS 130 receives a separate MS MAP 320 in the first hop BS frame from the BS 110 in step S642. The MS 130 identifies the first hop MS data zone indicated by the separate MS MAP 320 in step S644, and receives first hop MS data in step S646. The MS 130 temporarily stores the first hop MS data in a buffer in step S648.

If it is determined that the scheme is type B, the MS 130 receives a simultaneous assignment MS MAP 410 in the first hop BS frame in step S650. The MS 130 identifies the location of a first hop MS data zone and the location of a second hop MS data zone through the simultaneous assignment MS MAP 410 in step S652. The MS 130 receives first hop MS data in the first hop MS data zone in step S646. The MS 130 temporarily stores the first hop MS data in a buffer in step S648.

If it is determined that the scheme is type C, the MS 130 receives a relay MAP 510 containing information on first hop MS data allocation in the first hop BS frame in step S654. The MS 130 identifies the location of a first hop MS data zone utilizing the relay MAP 510 in step S656. The MS 130 receives first hop MS data in the first hop MS data zone in step S646. The MS 130 temporarily stores the first hop MS data in a buffer in step S648.

Figure 7A:
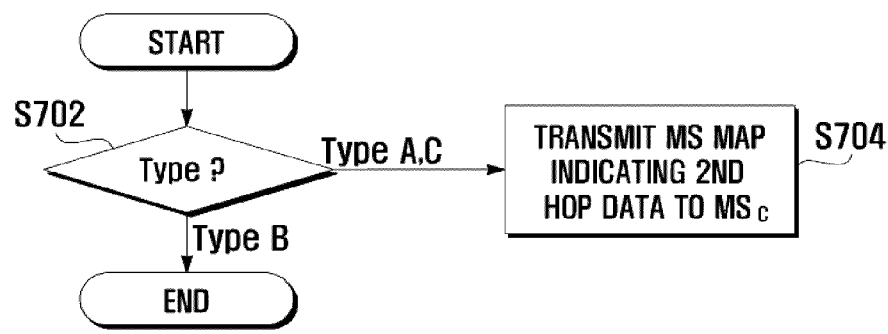
FIGS. 7A, 7B and 7C are flowcharts illustrating procedures for processing resource allocation information performed respectively by a BS, an RS, and an MS at a second time slot in a transparent relay mode according to an exemplary embodiment of the present invention.
Figure 7B:
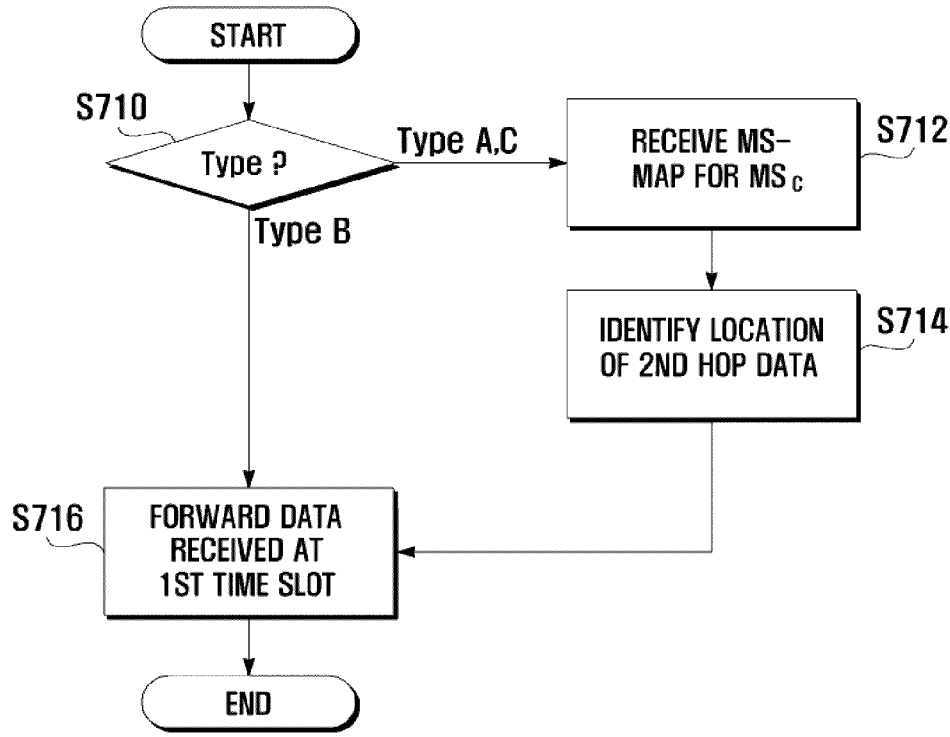
Figure 7C:
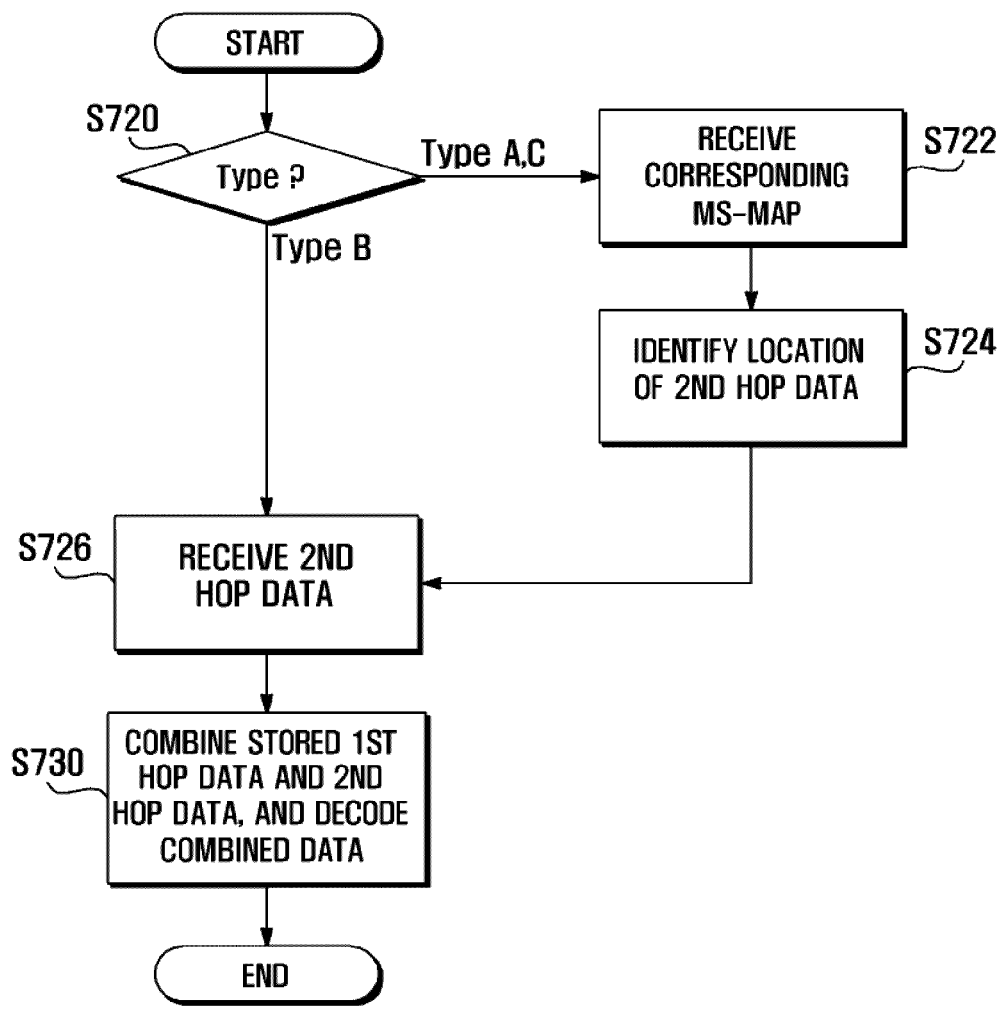

FIGS. 7A, 7B and 7C are flowcharts illustrating procedures for processing resource allocation information performed respectively by a BS 110, an RS 120, and an MS 130 at a second time slot in a transparent relay mode according to an exemplary embodiment of the present invention.

FIG. 7A is a flowchart illustrating a procedure for a BS 110 at a second time slot in a transparent relay mode according to an exemplary embodiment of the present invention.

Referring to FIG. 7A, the BS 110 determines the type of the scheme for transmitting resource allocation information in step S702.

If it is determined that the scheme is type A or type C, the BS 110 transmits an MS MAP indicating second hop resource allocation in the second hop BS frame in step S704.

In contrast, if it is determined that the scheme is type B, the BS 110 does not transmit additional resource allocation information in the second hop BS frame. This is because information for second hop resource allocation has already been transmitted through a simultaneous assignment MS MAP in the first time slot.

FIG. 7B is a flowchart illustrating a procedure for an RS 120 at a second time slot in a transparent relay mode according to an exemplary embodiment of the present invention.

Referring to FIG. 7B, the RS 120 determines the type of scheme for transmitting resource allocation information in step S710.

If it is determined that the scheme is type A or type C, the RS 120 receives a corresponding MS MAP in the second hop BS frame in step S712, and determines the location of a second hop MS data zone in the second hop RS frame in step S714. The RS 120 transmits second hop MS data (re-encoded first hop MS data) to the MS 130 by inserting the second hop MS data in the second hop MS data zone in step S716.

In contrast, if it is determined that the scheme is type B, the RS 120 transmits second hop MS data (re-encoded first hop MS data) in the second hop MS data zone of the second hop RS frame to the MS 130 in step S716. In this case, the RS 120 has already obtained information regarding second hop MS data allocation in the first time slot, and hence does not have to identify the location of the second hop MS data zone.

FIG. 7C is a flowchart illustrating a procedure for an MS 130 at a second time slot in a transparent relay mode according to an exemplary embodiment of the present invention.

Referring to FIG. 7C, the MS 130 determines the type of scheme for transmitting resource allocation information in step S720.

If it is determined that the scheme is type A or type C, the MS 130 receives a corresponding MS MAP in the second hop BS frame from the BS 110 in step S722. The MS 130 identifies the location of second hop MS data on the basis of the MS MAP in step S724. The MS 130 receives second hop MS data in the identified data zone in step S726. Thereafter, the MS 130 combines the first hop MS data with the second hop MS data, and decodes the combined MS data in step S730.

In contrast, if it is determined that the scheme is type B, the MS 130 receives second hop MS data in the identified data zone in step S726. In this case, the MS 130 has already obtained information regarding second hop MS data allocation at the first time slot, and hence does not have to identify the location of the second hop MS data. Thereafter, the MS 130 combines the first hop MS data with the second hop MS data, and decodes the combined MS data in step S730.

<Nontransparent Relay Mode>

Next, a description is given of an exemplary embodiment in which the RS 120 operates in the nontransparent mode. In this case, the MS 130 receives control information from the RS 120.

FIG. 8 illustrates a structure of frames sent and received between a BS 110, an RS 120, and an MS 130 in a nontransparent relay mode according to an exemplary embodiment of the present invention. The structure of frames in FIG. 8 commonly applies to the type A, B and C schemes in the nontransparent relay mode. Here, the "first hop frame" and "second hop frame" are named with respect to a piece of packet data being sent to the MS, and indicate whether particular packet data is transmitted at the first hop interval or at the second hop interval.

Referring to FIG. 8, frames in the nontransparent mode may be divided into a first hop frame 805 transmitted at the first time slot and a second hop frame 810 transmitted at the second time slot. Frames in the nontransparent mode may also be divided by sender into a BS frame 815 and an RS frame 820. For example, a frame sent by a BS at the first time slot may be termed a first hop BS frame.

Each frame in FIG. 8 is split into a downlink sub-frame and an uplink sub-frame. For ease of description, only downlink sub-frames are depicted.

A downlink sub-frame may include an access zone 825 for communication between the MS 130 and the BS 110 or RS 120, and a relay zone 830 for providing a relay link between the BS 110 and RS 120. The BS 110 and RS 120 sends the preambles 840 and MS MAPs 850 to the MS 130 at the same point in time. Hence, the RS 120 cannot obtain resource allocation information as to RS data from the BS 110, at the access zone 825. Instead, the RS 120 obtains resource allocation information as to RS data by extracting a relay MAP from the relay zone 830.

Figure 9:
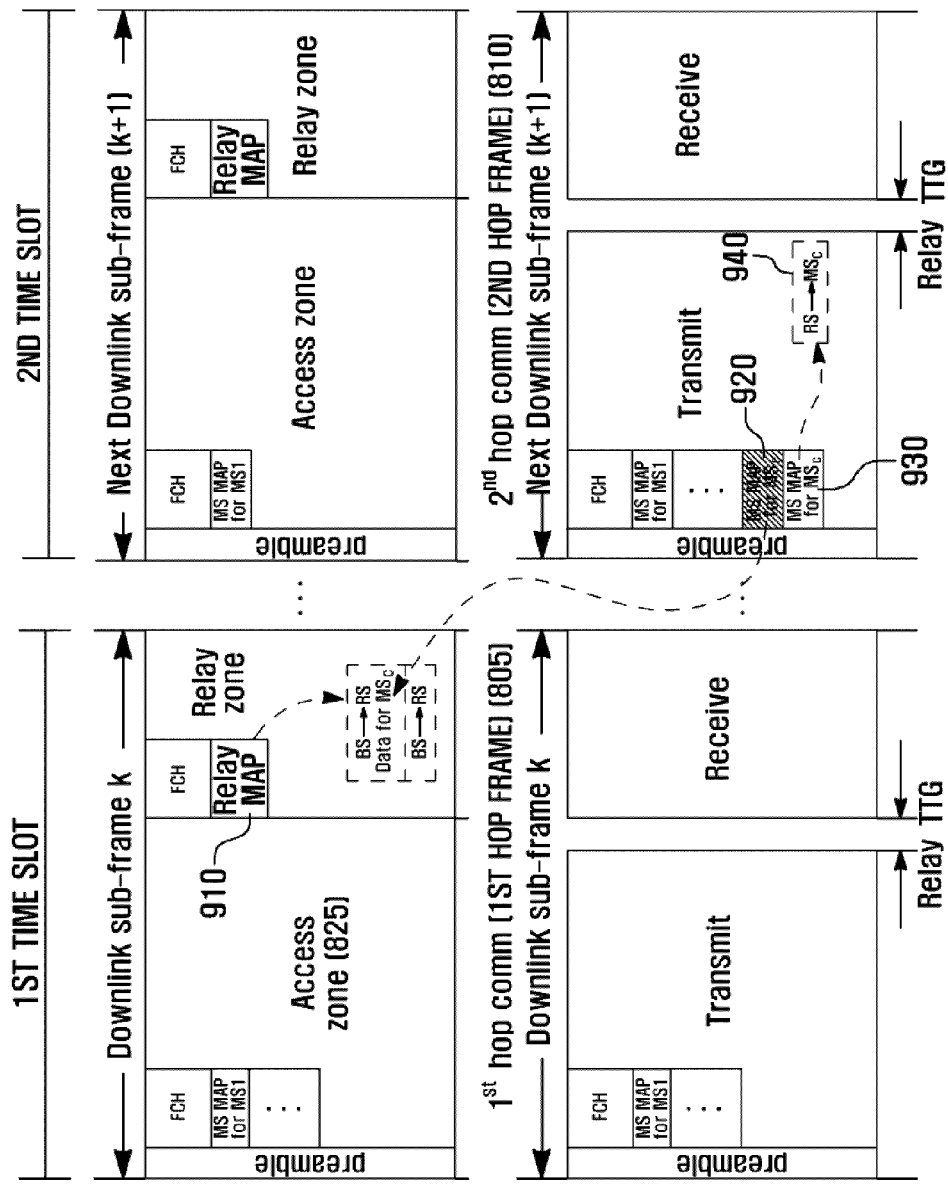
FIG. 9 illustrates a structure of frames and a type A scheme for an RS transmitting resource allocation information using a separate MS MAP in a nontransparent relay mode according to an exemplary embodiment of the present invention.

FIG. 9 illustrates a structure of frames and a type A scheme for an RS 120 transmitting resource allocation information using a separate MS MAP in a nontransparent relay mode. In this case, the resource allocation information to be received by the MS 130 is transmitted through the second hop RS frame, not through the first hop RS frame according to an exemplary embodiment of the present invention.

First Time Slot (Type A)

In the nontransparent relay mode, at the first time slot, the BS 110 and RS 120 each transmit control information in the access zones 825.

The BS 110 transmits a relay MAP 910 indicating an RS data zone and first hop MS data in the relay zone 830 to the RS 120.

As the RS 120 transmits control information in the access zone 825 to the MS 130, and it cannot receive control information or data from the BS 110 at the same point in time. Hence, the RS 120 receives a relay MAP 910 in the relay zone 830, identifies the location of the RS data zone, and receives first hop MS data. The RS 120 re-encodes the first hop MS data.

At the first time slot, the MS 130 does not receive an MS MAP indicating an MS data zone from the RS 120. This is because the RS 120 does not transmit an additional MS MAP. The MS 130 temporarily stores the received first hop BS frame at the first time slot. In an exemplary embodiment, the stored first hop BS frame may include data in the relay zone.

Second Time Slot (Type A)

In the nontransparent relay mode, at the second time slot, the BS 110 does not transmit a separate BS frame containing resource allocation information related to an exemplary embodiment of the present invention.

The RS 120 transmits a separate MS MAP 920 indicating first hop MS data allocation by allocating the separate MS MAP 920 in the second hop RS frame. The RS 120 transmits an MS MAP indicating second hop MS data allocation by allocating the MS MAP in the second hop RS frame. Thereafter, the RS 120 transmits second hop MS data (re-encoded first hop MS data) in the second hop MS data zone to the MS 130.

At the second time slot, the MS 130 receives a second hop RS frame from the RS 120, and obtains information on first hop MS data allocation by checking the separate MS MAP 920. The MS 130 extracts first hop MS data from the stored first hop BS frame on the basis of the obtained allocation information.

The MS 130 refers to the MS MAP 930 indicating the second hop MS data zone 940 in the received second hop RS frame, and extracts second hop MS data.

Finally, the MS 130 combines the first hop MS data with the second hop MS data, and decodes the combined MS data.

Figure 10:
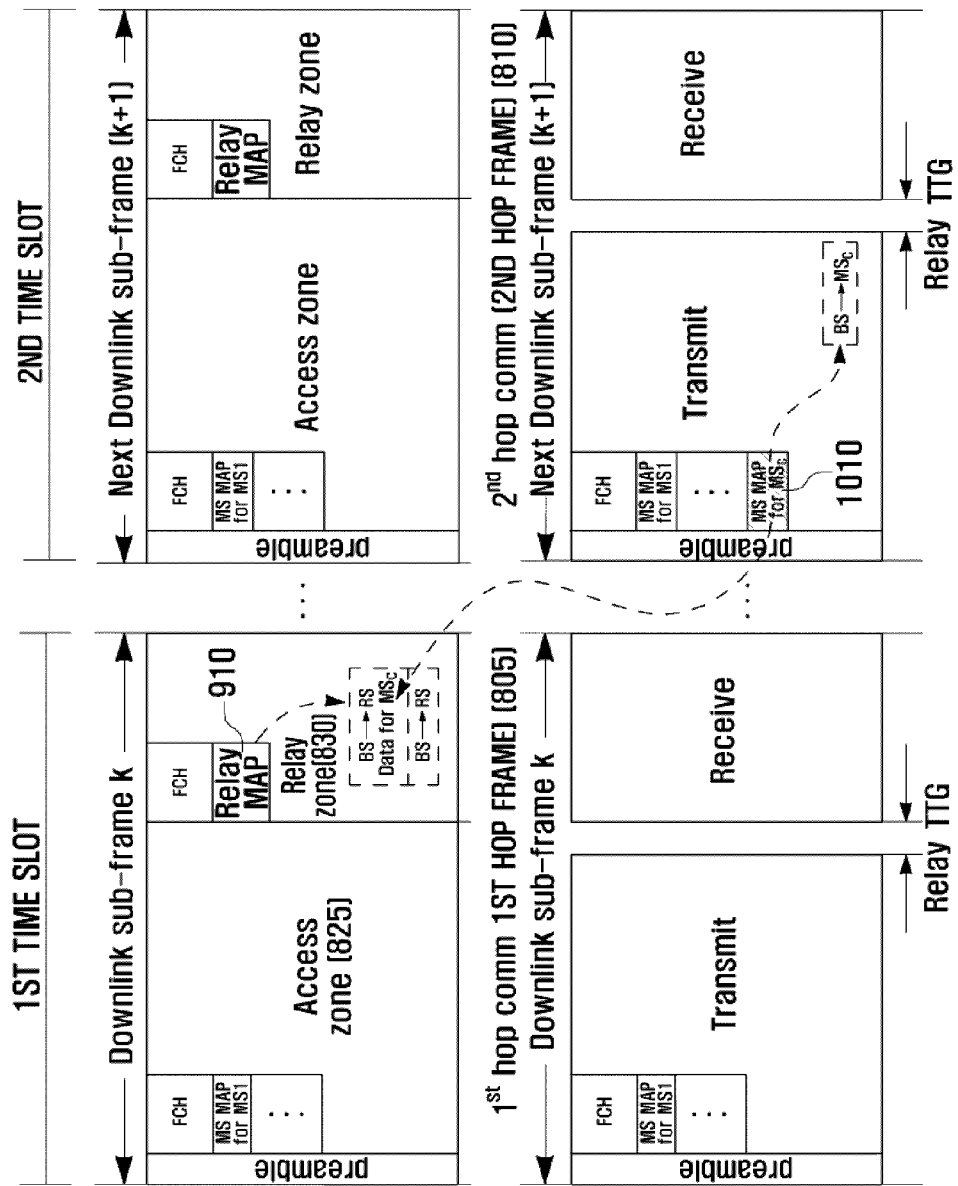
FIG. 10 illustrates a structure of frames and a type B scheme for an RS transmitting resource allocation information using a simultaneous assignment MS MAP in a nontransparent relay mode according to an exemplary embodiment of the present invention.

FIG. 10 illustrates a structure of frames and a type B scheme for an RS 120 transmitting resource allocation information using a simultaneous assignment MS MAP in a nontransparent relay mode according to an exemplary embodiment of the present invention. In this case, the resource allocation information to be received by the MS 130 is transmitted through the second hop RS frame, not through the first hop RS frame.

First Time Slot (Type B)

At the first time slot, the BS 110 transmits a relay MAP 910 indicating an RS data zone in the relay zone 830 to the RS 120.

The RS 120 receives the relay MAP 910 in the relay zone 830 from the BS 110, identifies the location of the RS data zone, and receives first hop MS data. The RS 120 re-encodes the first hop MS data.

At the first time slot, as in the case of type A, the MS 130 does not receive an MS MAP indicating an MS data zone from the RS 120. The MS 130 temporarily stores the received first hop BS frame in a buffer. In an exemplary embodiment, the stored first hop BS frame may have data in the relay zone.

Second Time Slot (Type B)

In the nontransparent relay mode, as in the case of type A at the second time slot, the BS 110 does not transmit a separate BS frame containing resource allocation information related to an exemplary embodiment of the present invention.

At the second time slot, the RS 120 transmits a simultaneous assignment MS MAP 1010 indicating both a first hop MS data zone and second hop MS data zone by allocating the simultaneous assignment MS MAP 1010 in the second hop RS frame. The RS 120 transmits second hop MS data in the preset data zone of the second hop RS frame.

At the second time slot, the MS 130 receives a second hop RS frame from the RS 120. The MS 130 refers to the simultaneous assignment MS MAP 1010, and obtains information regarding both the first hop MS data zone and second hop MS data zone.

The MS 130 extracts first hop MS data from the first hop BS frame stored in the buffer. At the same time, the MS 130 extracts second hop MS data from the second hop RS frame.

Finally, the MS 130 combines the first hop MS data with the second hop MS data, and decodes the combined MS data.

Figure 11:
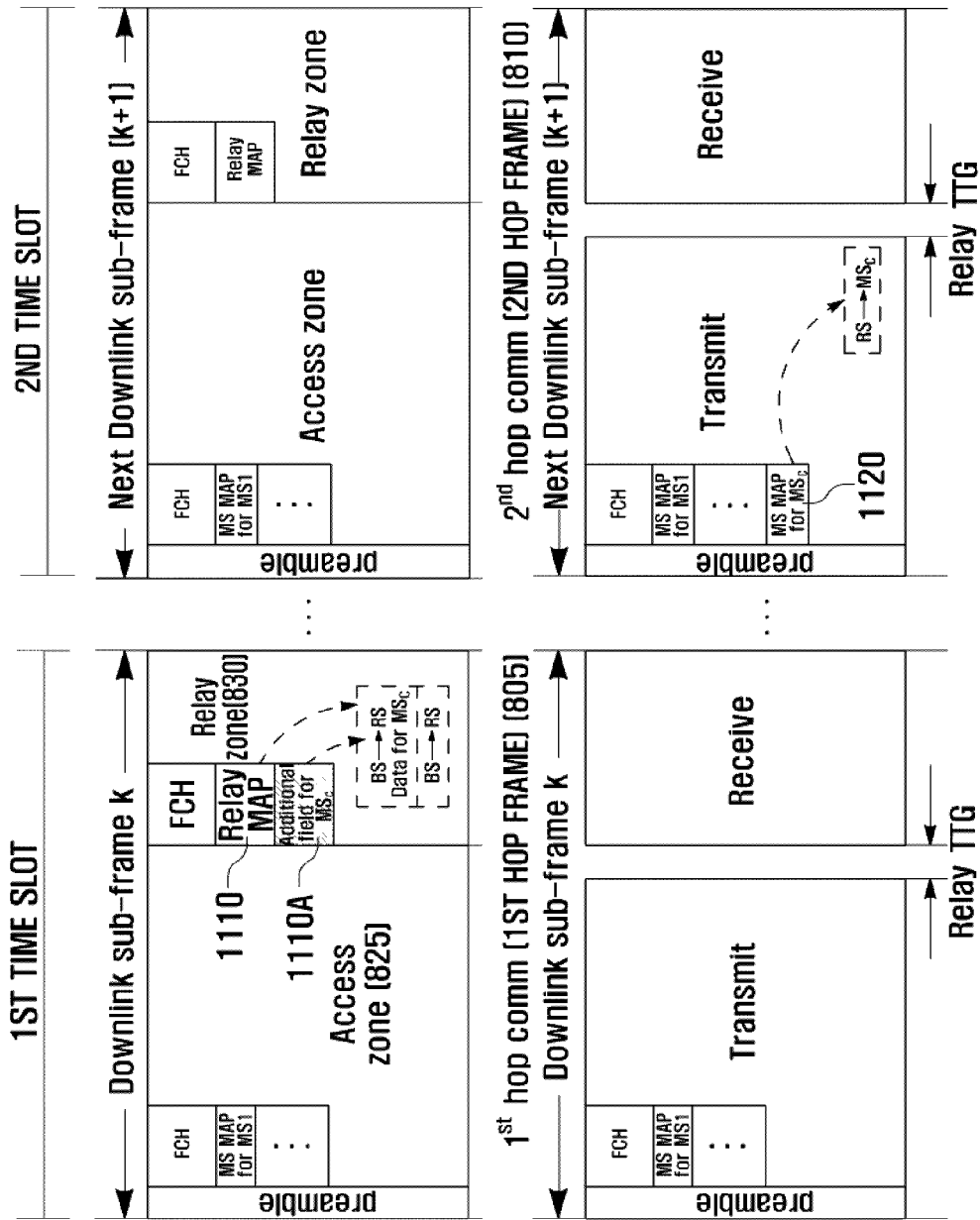
FIG. 11 illustrates a structure of frames and a type C scheme for a BS transmitting resource allocation information using a relay MAP in a nontransparent relay mode according to an exemplary embodiment of the present invention.

FIG. 11 illustrates a structure of frames and a type C scheme for a BS 110 transmitting resource allocation information using a relay MAP in a nontransparent relay mode according to an exemplary embodiment of the present invention. In this case, the resource allocation information to be received by the MS 130 is transmitted through the first hop BS frame and the second hop RS frame.

First Time Slot (Type C)

At the first time slot, the BS 110 transmits a relay MAP 1110 containing MS data zone information 1110A by allocating the relay MAP 1110 in the first hop BS frame. The BS 110 transmits first hop MS data in the preset data zone.

The RS 120 receives the relay MAP 1110 from the BS 110. The RS 120 refers to the indicated RS data zone, and receives first hop MS data. The RS 120 re-encodes the first hop MS data.

Unlike the case of type A or type B in the first time slot, the MS 130 receives resource allocation information in the first hop BS frame from the BS 110. That is, the MS 130 refers to the MS data zone information 1110A of the relay MAP 1110, receives first hop MS data in the identified data zone, and temporarily stores the first hop MS data in a buffer.

Second Time Slot (Type C)

In the nontransparent relay mode, at the second time slot, the BS 110 does not transmit a separate BS frame containing resource allocation information related to an exemplary embodiment of the present invention.

The RS 120 transmits an MS MAP 1120 indicating an MS data zone by allocating the MS MAP 1120 in the second hop RS frame. The RS 120 transmits second hop MS data in the preset data zone of the second hop RS frame.

At the second time slot, the MS 130 receives a second hop RS frame from the RS 120.

At the second time slot, the MS 130 receives a second hop RS frame from the RS 120. The MS 130 refers to the MS MAP 1120, and obtains information regarding the second hop MS data zone. The MS 130 receives second hop MS data from the second hop MS data zone. Finally, the MS 130 combines the first hop MS data obtained at the first time slot and the second hop MS data obtained at the second time slot together, and decodes the combined MS data.

Figure 12A:
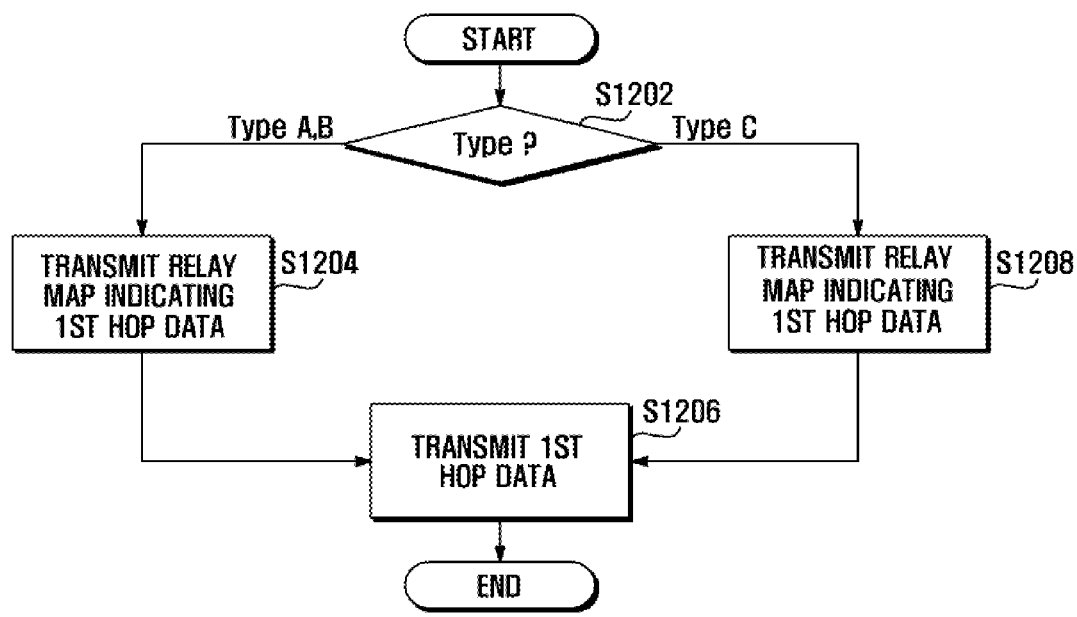
FIGS. 12A, 12B and 12C are flowcharts illustrating procedures for processing resource allocation information performed respectively by a BS, an RS, and an MS at a first time slot in a nontransparent relay mode according to an exemplary embodiment of the present invention.
Figure 12B:
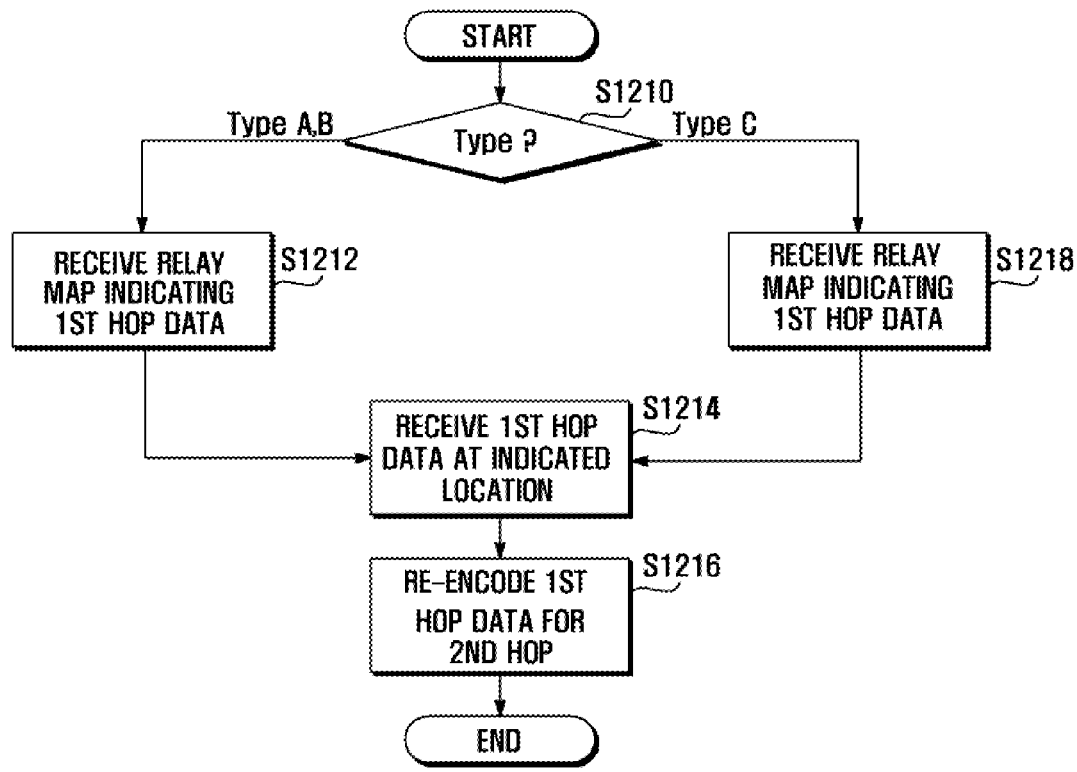
Figure 12C:
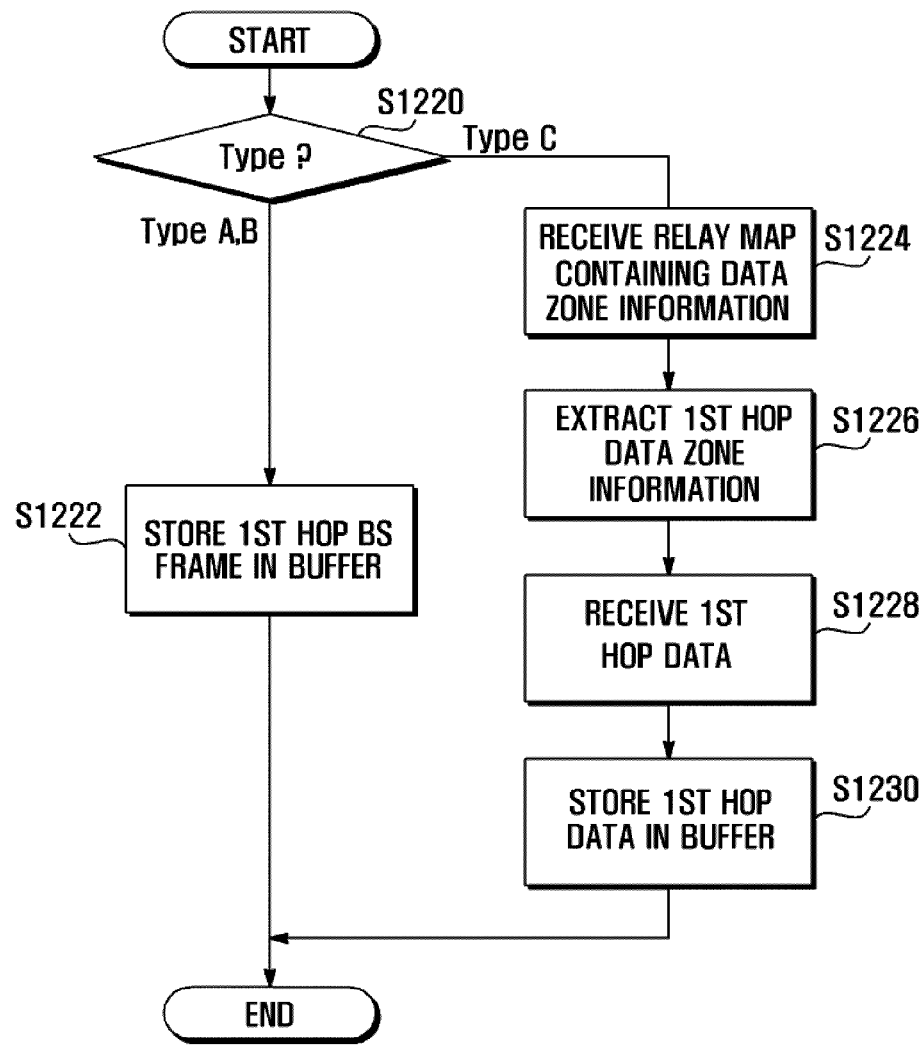

FIGS. 12A, 12B and 12C are flowcharts illustrating procedures for processing resource allocation information performed respectively by a BS 110, an RS 120, and an MS 130 at a first time slot in a nontransparent relay mode.

FIG. 12A is a flowchart illustrating a procedure for a BS 110 at a first time slot in a nontransparent relay mode according to an exemplary embodiment of the present invention.

Referring to FIG. 12A, the BS 110 determines the type of scheme for transmitting resource allocation information in step S1202.

If it is determined that the scheme is type A or type B, the BS 110 transmits a relay MAP 910 containing RS data zone information by allocating the relay MAP 910 in the first hop BS frame in step S1204. The BS 110 transmits first hop MS data in the indicated data zone in step S1206.

In contrast, if it is determined that the scheme is type C, the BS 110 transmits a relay MAP 1110 containing first hop MS data zone information 1110A by allocating the relay MAP 1110 in the first hop BS frame in step S1208. The BS 110 transmits first hop MS data in the indicated data zone in step S1206.

FIG. 12B is a flowchart illustrating a procedure for an RS 120 at a first time slot in a nontransparent relay mode according to an exemplary embodiment of the present invention.

Referring to FIG. 12B, the RS 120 determines the type of scheme for transmitting resource allocation information in step S1210.

If it is determined that the scheme is type A or type B, the RS 120 receives a relay MAP 910 in the relay zone 830 in step S1212. The RS 120 identifies an indicated RS data zone, and receives first hop MS data in step S1214. The RS 120 re-encodes the first hop MS data in step S1216.

In contrast, if it is determined that the scheme is type C, the RS 120 receives a relay MAP 1110 containing first hop MS data zone information 1110A in the first hop BS frame in step S1218. The RS 120 identifies an indicated RS data zone, and receives first hop MS data in step S1214. The RS 120 re-encodes the first hop MS data in step S1216.

FIG. 12C is a flowchart illustrating a procedure for an MS 130 at a first time slot in a nontransparent relay mode according to an exemplary embodiment of the present invention.

Referring to FIG. 12C, the MS 130 determines the type of scheme for transmitting resource allocation information in step S1220.

If it is determined that the scheme is type A or type B, the MS 130 temporarily stores the first hop BS frame received at the first time slot in step S1222. In this case, as the RS 120 does not transmit a separate MS MAP at the first time slot, the MS 130 cannot receive MS data zone information.

In contrast, if it is determined that the scheme is type C, the MS 130 receives a relay MAP 1110 containing MS data zone information 1110A in the first hop BS frame in step S1224, and extracts the MS data zone information 1110A in step S1226. The MS 130 receives first hop MS data in the data zone indicated by the MS data zone information 1110A in step S1228, and temporarily stores the first hop MS data in a buffer in step S1230.

Figure 13A:
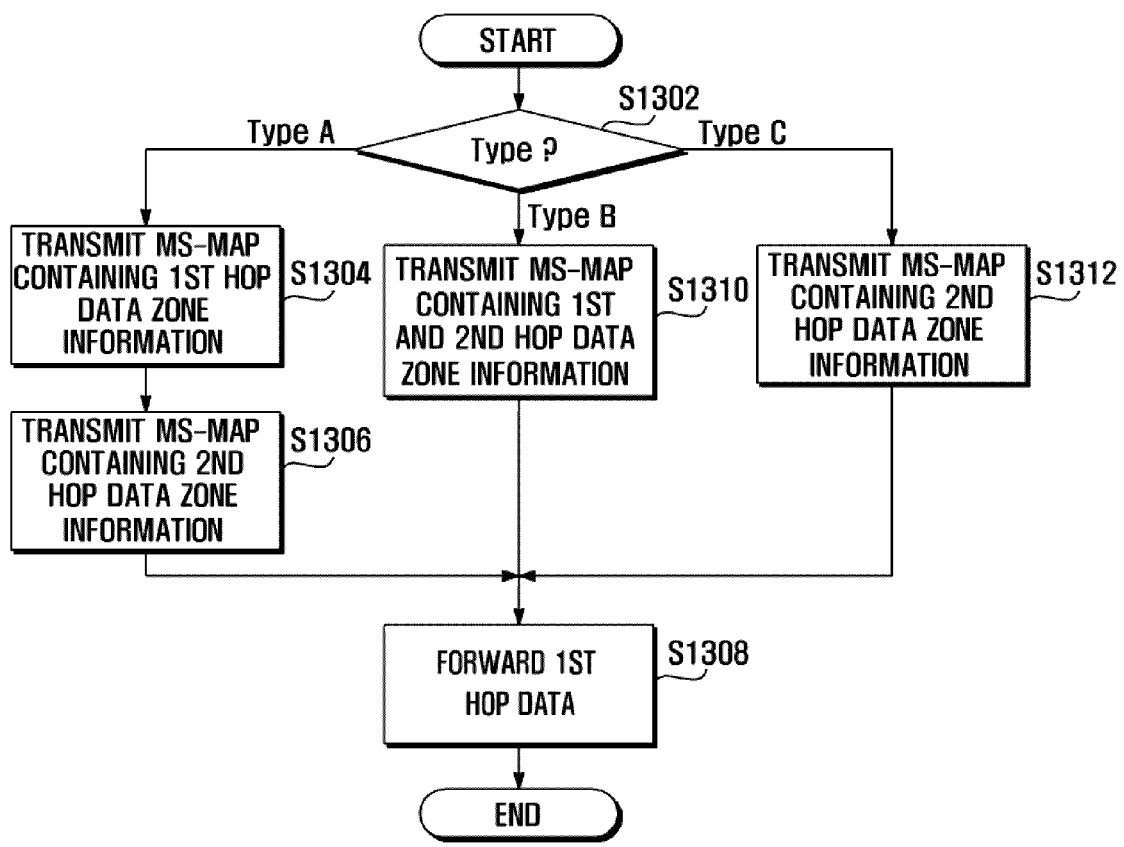
FIGS. 13A and 13B are flowcharts illustrating procedures for processing resource allocation information performed respectively by an RS and an MS at a second time slot in a nontransparent relay mode according to an exemplary embodiment of the present invention.
Figure 13B:
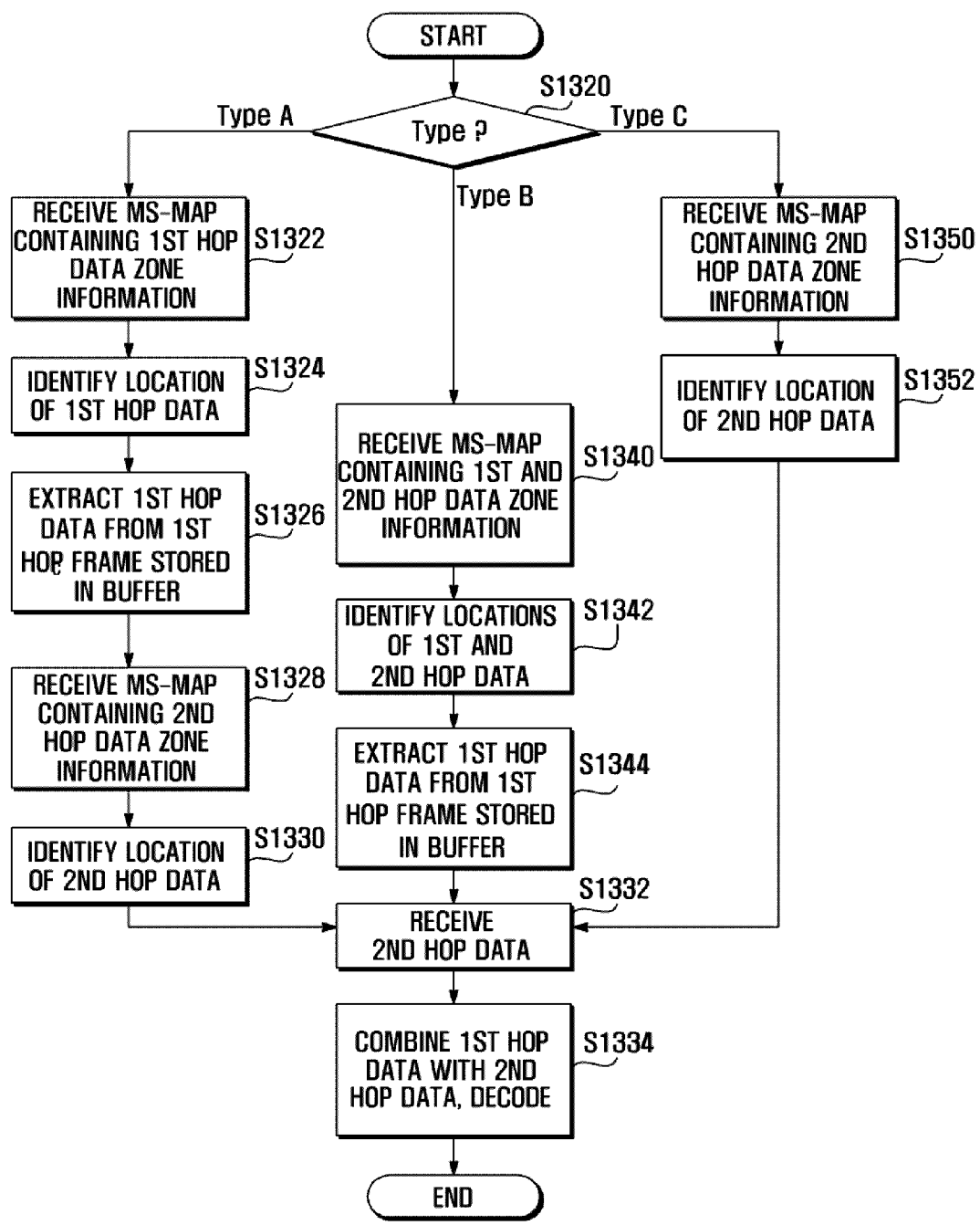

FIGS. 13A and 13B are flowcharts illustrating procedures for processing resource allocation information performed respectively by the RS 120 and mobile 130 station at the second time slot in the nontransparent relay mode.

FIG. 13A is a flowchart illustrating a procedure for an RS 120 at a second time slot in a nontransparent relay mode according to an exemplary embodiment of the present invention.

Referring to FIG. 13A, the RS 120 determines the type of scheme for transmitting resource allocation information in step S1302.

If it is determined that the scheme is type A, the RS 120 transmits a separate MS MAP 920 containing first hop MS data zone information by allocating the separate MS MAP 920 in the second hop RS frame in step S1304. The RS 120 transmits an MS MAP 930 containing information on the second hop MS data zone 940 by allocating the MS MAP 930 in the second hop RS frame in step S1306. The RS 120 transmits second hop MS data (re-encoded first hop MS data) to the MS 130 by inserting the second hop MS data in the second hop MS data zone in step S1308.

If it is determined that the scheme is type B, the RS 120 transmits a simultaneous assignment MS MAP 1010 by allocating the simultaneous assignment MS MAP 1010 in the second hop RS frame in step S1310. The simultaneous assignment MS MAP 1010 contains both first hop MS data zone information and second hop MS data zone information. The RS 120 transmits second hop MS data (re-encoded first hop MS data) to the MS 130 by inserting the second hop MS data in the second hop MS data zone in step S1308.

If it is determined that the scheme is type C, the RS 120 transmits an MS MAP 1120 containing second hop MS data zone information by allocating the MS MAP 1120 in the second hop RS frame in step S1312. The RS 120 transmits second hop MS data (re-encoded first hop MS data) to the MS 130 by inserting the second hop MS data in the second hop MS data zone in step S1308.

FIG. 13B is a flowchart illustrating a procedure for an MS 130 at a second time slot in a nontransparent relay mode according to an exemplary embodiment of the present invention.

Referring to FIG. 13B, the MS 130 determines the type of scheme for transmitting resource allocation information in step S1320.

If it is determined that the scheme is type A, the MS 130 receives a separate MS MAP 920 in the second hop RS frame from the RS 120 in step S1322. The MS 130 refers to the separate MS MAP 920 to obtain the first hop MS data zone information in step S1324. The MS 130 extracts the first hop MS data indicated by the first hop MS data zone information from the first hop BS frame stored in the buffer in step S1326. The MS 130 obtains the MS MAP 930 containing information on the second hop MS data zone 940 from the second hop RS frame in step S1328. The MS 130 identifies the second hop MS data zone 940 utilizing the MS MAP 930 in step S1330. The MS 130 receives the second hop MS data in the identified second hop MS data zone in step S1332. Finally, the MS 130 combines the first hop MS data with the second hop MS data, and decodes the combined MS data in step S1334.

If it is determined that the scheme is type B, the MS 130 receives the second hop RS frame in step S1340. Here, the second hop RS frame includes a simultaneous assignment MS MAP 1010 containing both first hop MS data zone information and second hop MS data zone information. The MS 130 refers to the simultaneous assignment MS MAP 1010, and identifies the first hop MS data zone and second hop MS data zone in step S1342. The MS 130 obtains the first hop MS data from the first hop BS frame stored in the buffer in step S1344. The MS 130 receives the second hop MS data in the identified second hop MS data zone in step S1332. Finally, the MS 130 combines the first hop MS data with the second hop MS data, and decodes the combined MS data in step S1334.

If it is determined that the scheme is type C, the MS 130 receives an MS MAP 1120 in the second hop RS frame from the RS 120 in step S1350. The MS 130 obtains second hop MS data zone information utilizing the MS MAP 1120 in step S1352. The MS 130 receives the second hop MS data in the identified second hop MS data zone in step S1332. Finally, the MS 130 combines the first hop MS data with the second hop MS data, and decodes the combined MS data in step S1334.

<Nontransparent Relay Plus Sliding MAP Mode>

Next, a description is given of an exemplary embodiment in which the RS 120 operates in the nontransparent mode and the BS 110 transmits a separate sliding MAP frame. In this case, the MS 130 receives control information from the RS 120.

A sliding MAP frame is utilized as a MAP signaling scheme indicating resource allocation information of the next frame. By the use of a sliding MAP frame, the MS 130 does not have to store the first hop BS frame in a buffer, unlike the case of the nontransparent relay mode.

Figure 14:
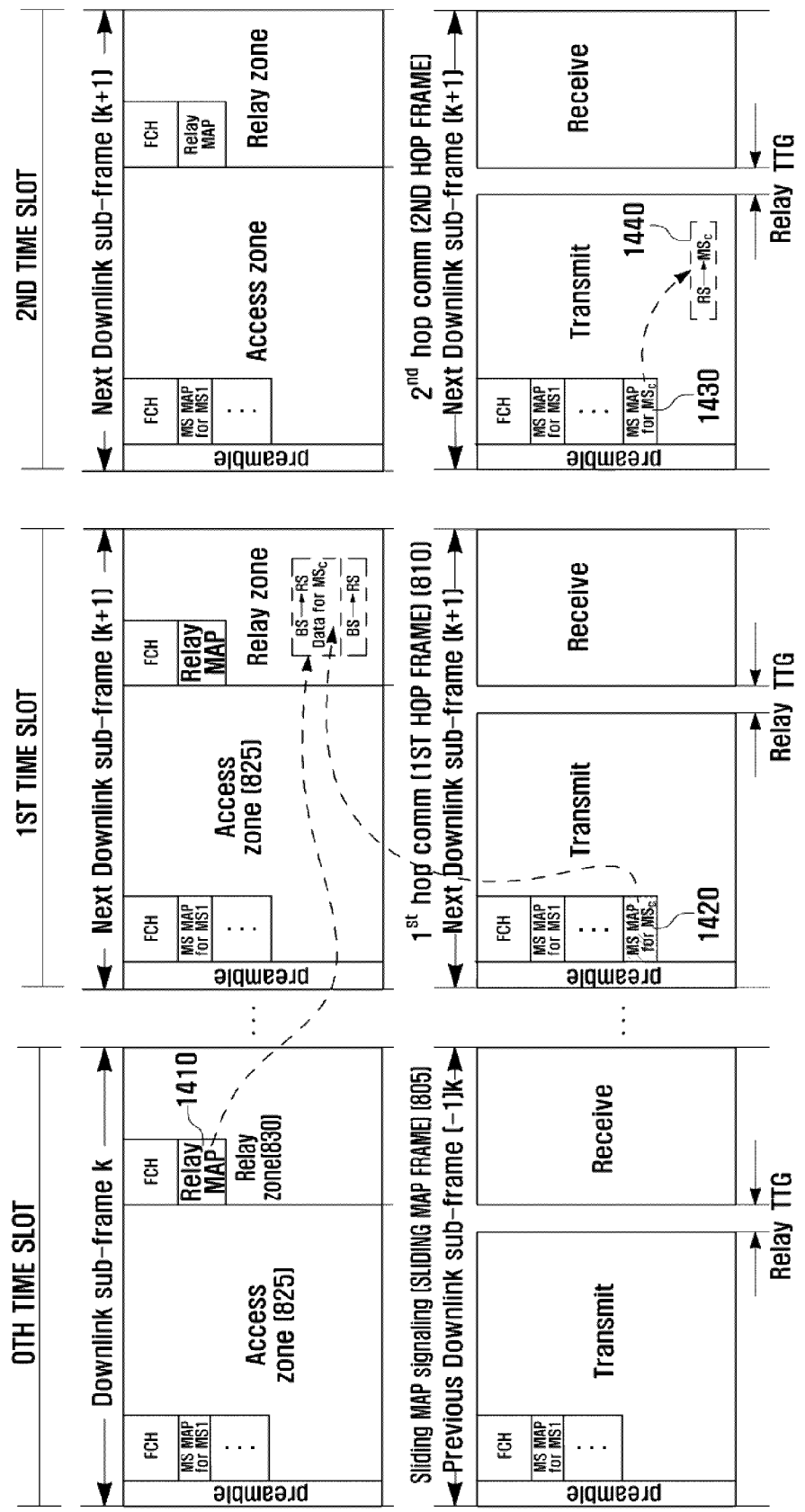
FIG. 14 illustrates a structure of frames and a type A scheme for transmitting resource allocation information of a next frame from a BS utilizing a sliding MAP frame to an RS in a nontransparent relay plus sliding MAP mode according to an exemplary embodiment of the present invention.

FIG. 14 illustrates a structure of frames and a type A scheme for transmitting resource allocation information of a next frame from a BS 110 utilizing a sliding MAP frame to an RS 120 in a nontransparent relay plus sliding MAP mode according to an exemplary embodiment of the present invention.

Zeroth Time Slot (Type A)

In the nontransparent relay plus sliding MAP mode, the zeroth time slot indicates a time slot occurring prior to the first time slot.

At the zeroth time slot, the BS 110 transmits a relay MAP 1410 by allocating the relay MAP 1410 in a sliding MAP frame. The relay MAP 1410 contains resource allocation information as to the first hop MS data in the next frame.

The RS 120 receives the sliding MAP frame from the BS 110 at the zeroth time slot. The RS 120 checks the relay MAP 1410 in the sliding MAP frame, and obtains resource allocation information as to the first hop MS data.

As the MS 130 does not receive a sliding MAP frame, it does not operate at the zeroth time slot.

First Time Slot (Type A)

At the first time slot, the BS 110 transmits the first hop MS data according to the resource allocation information of the relay MAP 1410 of the zeroth time slot.

The RS 120 has already obtained the MS data zone information at the zeroth time slot. The RS 120 transmits a separate MS MAP 1420 containing first hop MS data zone information by allocating the MS MAP 1420 in the access zone 825 of the first hop RS frame. The RS 120 receives the first hop MS data utilizing the MS data zone information obtained at the zeroth time slot, and re-encodes the first hop MS data.

At the first time slot, the MS 130 receives a separate MS MAP 1420 containing first hop MS data zone information from the RS 120. The MS 130 identifies the first hop MS data zone, and receives the first hop MS data. The MS 130 temporarily stores the first hop MS data in a buffer.

As described above, because the BS 110 provides resource allocation information of the next frame in advance through a sliding MAP frame, the RS 120 may allocate an MS data zone for the MS 130 at the first time slot. Hence, the MS 130 may immediately obtain corresponding MS data without buffering the whole first hop BS frame received at the first time slot, thereby reducing buffering overhead.

Second Time Slot (Type A)

In the nontransparent mode, at the second time slot, the BS 110 does not transmit a separate BS frame containing resource allocation information related to an exemplary embodiment of the present invention.

The RS 120 transmits an MS MAP 1430 containing information on the second hop MS data zone 1440 by allocating the MS MAP 1430 in the second hop RS frame. The RS 120 transmits second hop MS data by inserting the second hop MS data in the MS data zone 1440 of the second hop RS frame.

At the second time slot, the MS 130 receives a second hop RS frame from the RS 120, and obtains second hop MS data zone information by checking the separate MS MAP 1430 in the second hop RS frame. The MS 130 receives second hop MS data in the second hop MS data zone. Finally, the MS 130 combines the first hop MS data obtained at the first time slot with the second hop MS data obtained at the second time slot, and decodes the combined MS data.

Figure 15:
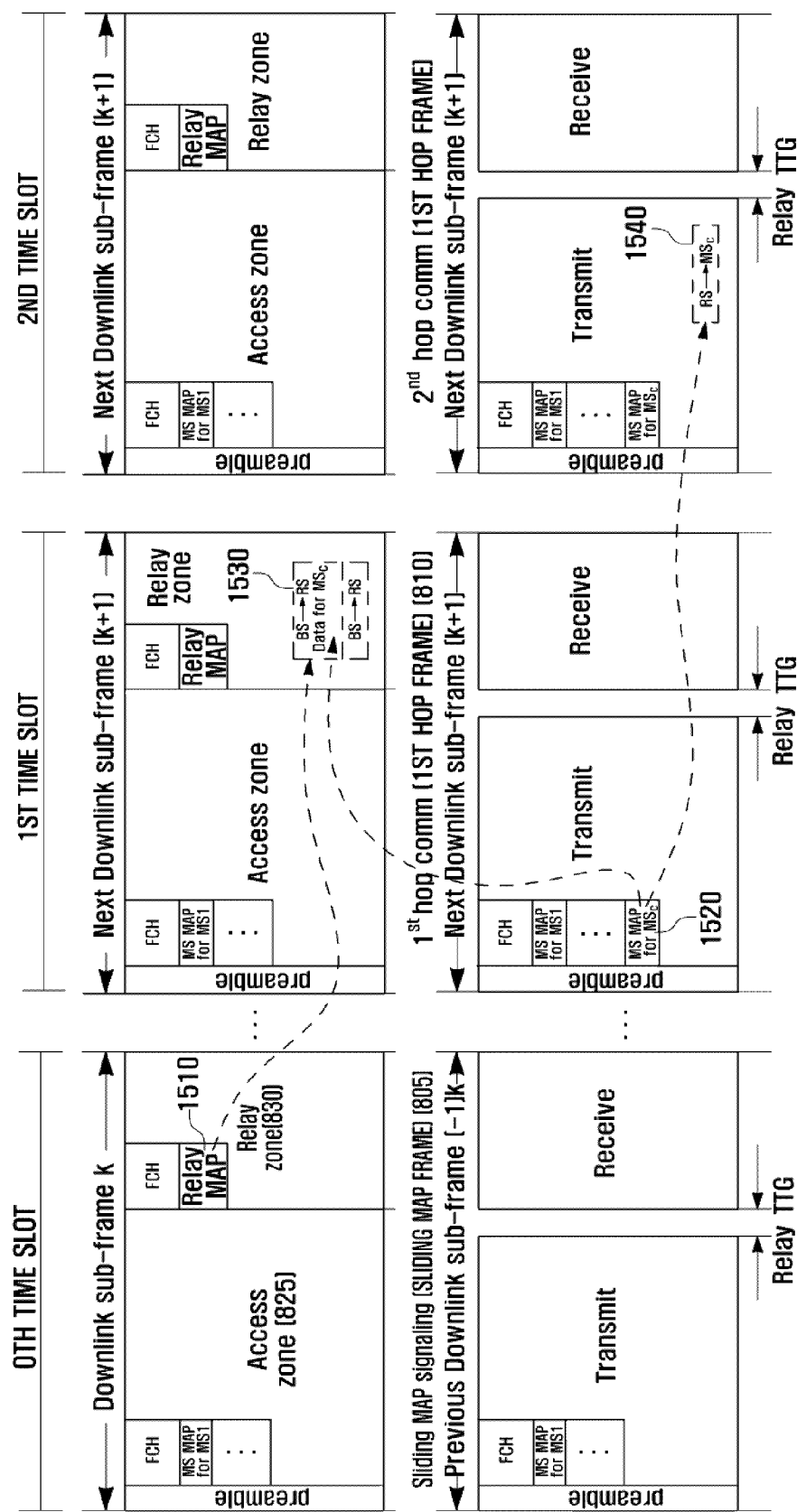
FIG. 15 illustrates a structure of frames and a type B scheme for transmitting resource allocation information of a next frame from a BS utilizing a sliding MAP frame to an RS in a nontransparent relay plus sliding MAP mode according to an exemplary embodiment of the present invention.

FIG. 15 illustrates a structure of frames and a type B scheme for transmitting resource allocation information of a next frame from a BS 110 utilizing a sliding MAP frame to an RS 120 in a nontransparent relay plus sliding MAP mode according to an exemplary embodiment of the present invention.

Zeroth Time Slot (Type B)

At the zeroth time slot, the BS 110 and the RS 120 each operate in the same manner as in the case of the zeroth time slot in FIG. 14, and a detailed description thereof is omitted herein.

First Time Slot (Type B)

At the first time slot, the BS 110 transmits the first hop MS data according to the resource allocation information of the relay MAP 1510 of the zeroth time slot.

The RS 120 has already obtained the MS data zone information at the zeroth time slot. Hence, the RS 120 transmits a simultaneous assignment MS MAP 1520 by allocating the MS MAP 1520 in the access zone 825 of the first hop RS frame. The simultaneous assignment MS MAP 1520 contains both first hop MS data zone information and second hop MS data zone information. The RS 120 receives the first hop MS data utilizing the MS data zone information obtained at the zeroth time slot.

The MS 130 receives the simultaneous assignment MS MAP 1520 in the first hop RS frame from the RS 120, and obtains information on both the first hop MS data zone 1530 and the second hop MS data zone 1540 utilizing the simultaneous assignment MS MAP 1520. The MS 130 receives the first hop MS data in the first hop MS data zone 1530, and temporarily stores the first hop MS data in a buffer.

Second Time Slot (Type B)

In the nontransparent mode, at the second time slot, the BS 110 does not transmit a separate BS frame containing resource allocation information related to an exemplary embodiment of the present invention.

The RS 120 transmits the first hop MS data obtained at the first hop time slot to the MS 130 by inserting the first hop MS data in the MS data zone of the second hop RS frame.

The MS 130 has already obtained information regarding the MS data zone in the second hop RS frame through the simultaneous assignment MS MAP 1520 received at the first time slot. Hence, the MS 130 immediately receives second hop MS data in the MS data zone 1540.

Figure 16A:
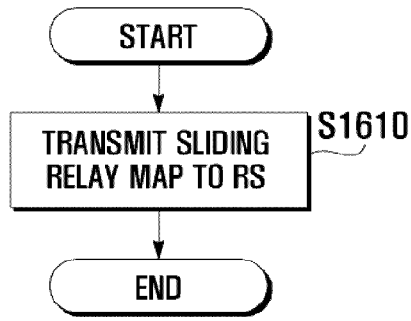
FIGS. 16A and 16B are flowcharts illustrating procedures for processing resource allocation information performed respectively by a BS and an RS at a zeroth time slot in a nontransparent relay plus sliding MAP mode according to an exemplary embodiment of the present invention.
Figure 16B:
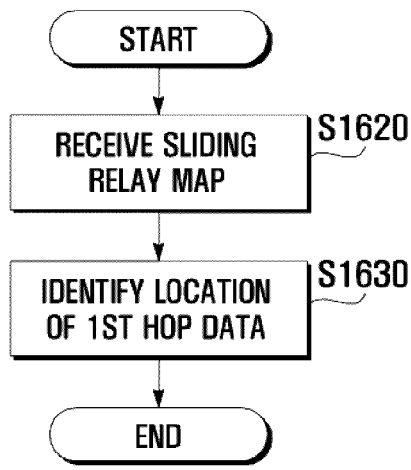

FIGS. 16A and 16B are flowcharts illustrating procedures for processing resource allocation information performed respectively by a BS 110 and an RS 120 at a zeroth time slot in a nontransparent relay plus sliding MAP mode.

FIG. 16A is a flowchart illustrating a procedure for a BS 110 at a zeroth time slot in a nontransparent relay plus sliding MAP mode according to an exemplary embodiment of the present invention.

Referring to FIG. 16A, the BS 110 transmits a relay MAP 1410 by allocating the relay MAP 1410 in a sliding MAP frame in step S1610. The relay MAP 1410 contains resource allocation information as to the first hop MS data in the next frame.

FIG. 16B is a flowchart illustrating a procedure for an RS 120 at a zeroth time slot in a nontransparent relay plus sliding MAP mode according to an exemplary embodiment of the present invention.

Referring to FIG. 16B, the RS 120 receives the sliding MAP frame from the BS 110 in step S1620. The RS 120 checks the relay MAP 1410 in the sliding MAP frame, and obtains resource allocation information as to the first hop MS data in step S1630.

Figure 17A:
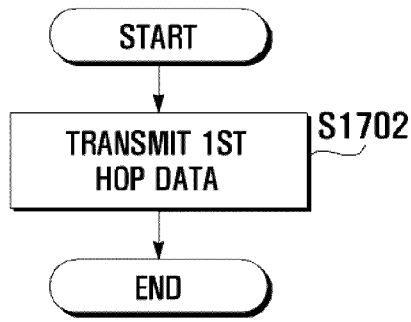
FIGS. 17A, 17B and 17C are flowcharts illustrating procedures for processing resource allocation information performed respectively by a BS, an RS, and an MS at a first time slot in a nontransparent relay plus sliding MAP mode according to an exemplary embodiment of the present invention.
Figure 17B:
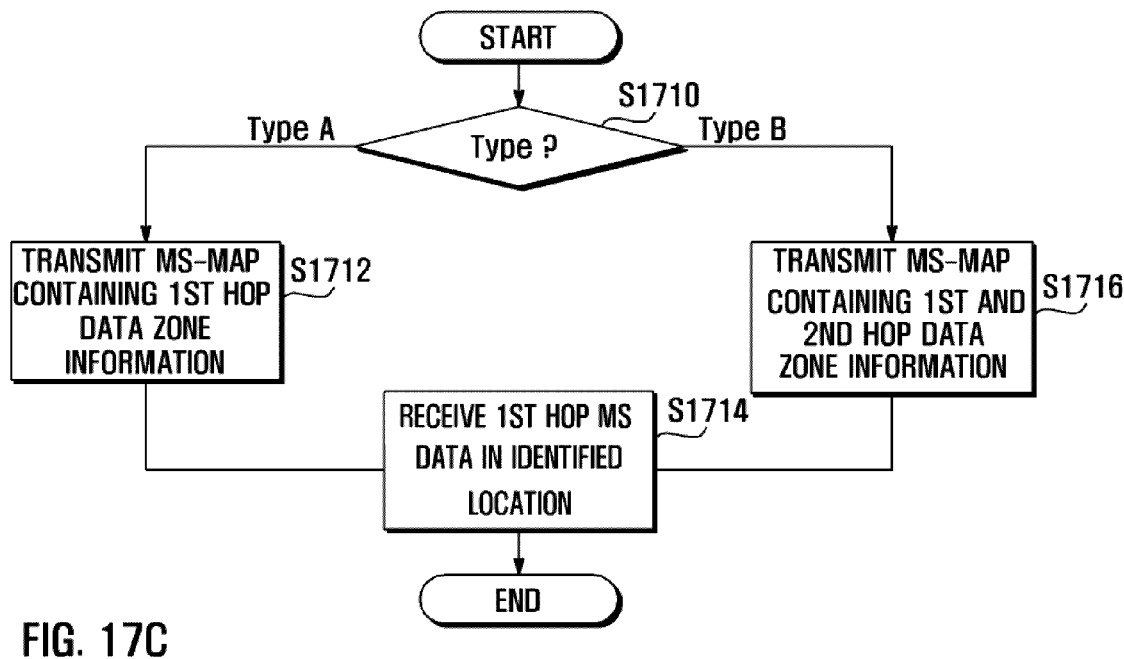
Figure 17C:
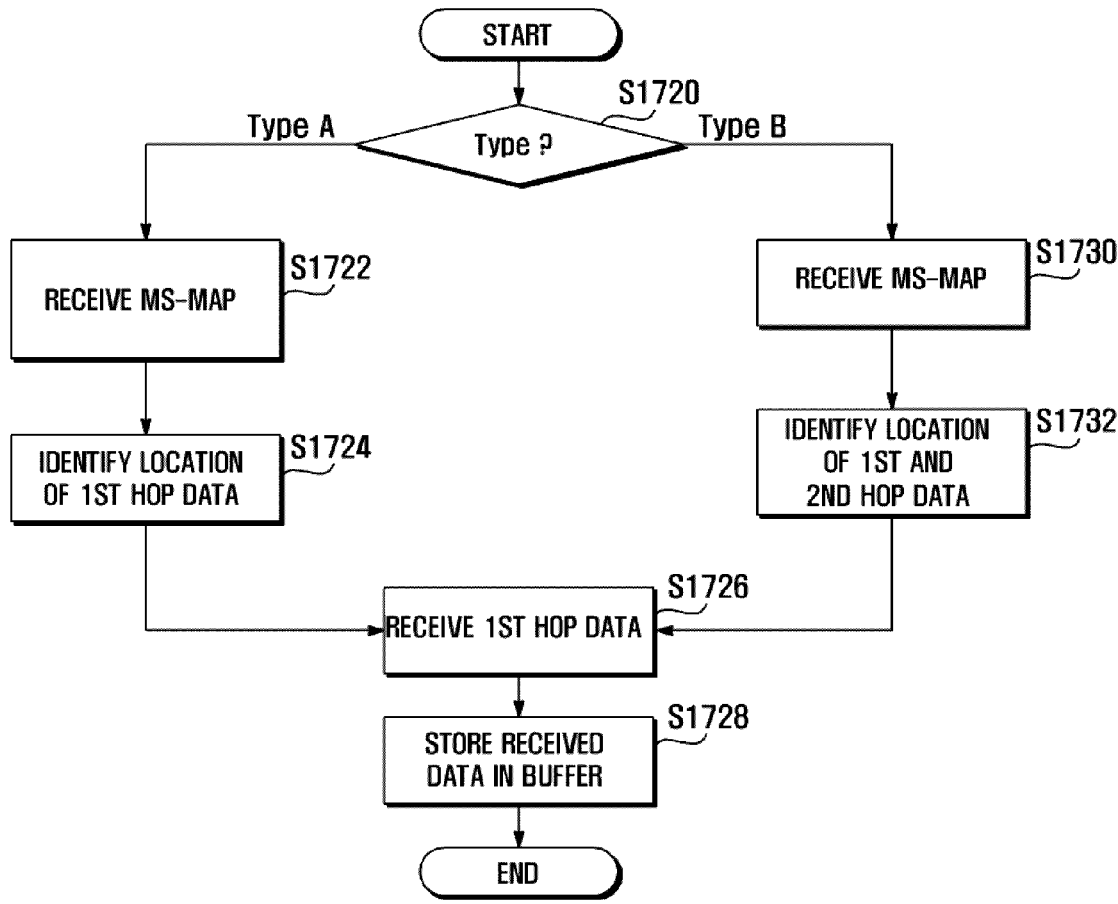

FIGS. 17A, 17B and 17C are flowcharts illustrating procedures for processing resource allocation information performed respectively by a BS 110, an RS 120, and an MS 130 at a first time slot in a nontransparent relay plus sliding MAP mode.

FIG. 17A is a flowchart illustrating a procedure for a BS 110 at a first time slot in a nontransparent relay plus sliding MAP mode according to an exemplary embodiment of the present invention.

Referring to FIG. 17A, the BS 110 transmits the first hop MS data according to the resource allocation information of the relay MAP 1510 of the zeroth time slot in step S1702.

FIG. 17B is a flowchart illustrating a procedure for an RS 120 at a first time slot in a nontransparent relay plus sliding MAP mode according to an exemplary embodiment of the present invention.

Referring to FIG. 17B, the RS 120 determines the type of scheme for transmitting resource allocation information in step S1710.

If it is determined that the scheme is type A, the RS 120 has already obtained the MS data zone information at the zeroth time slot. The RS 120 transmits a separate MS MAP 1420 containing first hop MS data zone information by allocating the MS MAP 1420 in the first hop RS frame in step S1712. The RS 120 receives the first hop MS data utilizing the obtained data zone information in step S1714.

In contrast, if it is determined that the scheme is type B, the RS 120 transmits a simultaneous assignment MS MAP 1520 by allocating the MS MAP 1520 in the first hop RS frame in step S1716. The simultaneous assignment MS MAP 1520 contains both first hop MS data zone information and second hop MS data zone information. The RS 120 receives the first hop MS data utilizing the obtained data zone information in step S1714.

FIG. 17C is a flowchart illustrating a procedure for a BS 110 at a first time slot in a nontransparent relay plus sliding MAP mode according to an exemplary embodiment of the present invention.

Referring to FIG. 17C, the MS 130 determines the type of the scheme for transmitting resource allocation information in step S1720.

If it is determined that the scheme is type A, the MS 130 receives a separate MS MAP 1420 containing MS data zone information in the first hop RS frame in step S1722. The MS 130 identifies the first hop MS data zone in step S1724. The MS 130 receives the first hop MS data in the identified data zone in step S1726, and temporarily stores the first hop MS data in a buffer in step S1728.

In contrast, if it is determined that the scheme is type B, the MS 130 receives the simultaneous assignment MS MAP 1520 in the first hop RS frame in step S1730. The MS 130 identifies information on both the first hop MS data zone 1530 and the second hop MS data zone 1540 in step S1732. The MS 130 receives the first hop MS data in the identified data zone in step S1726, and temporarily stores the first hop MS data in a buffer in step S1728.

Figure 18A:
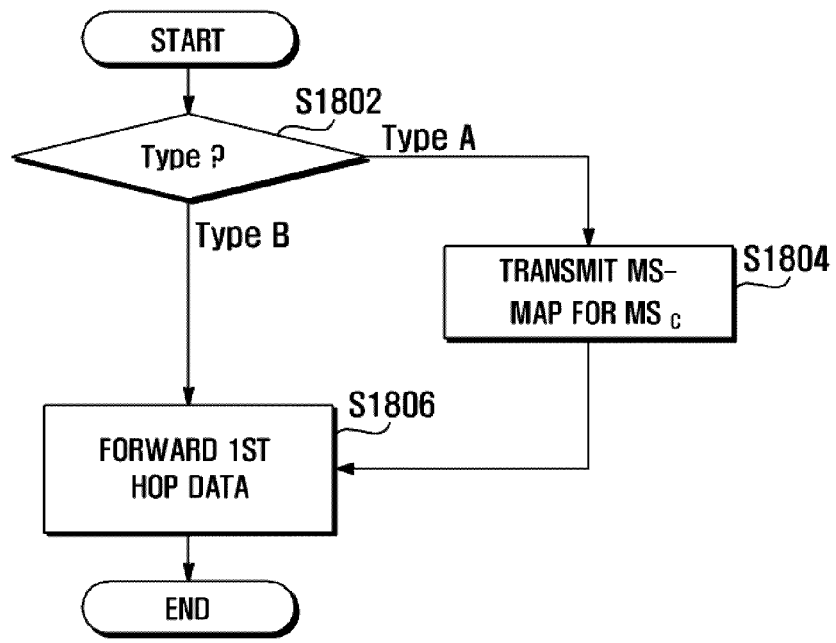
FIGS. 18A and 18B are flowcharts illustrating procedures for processing resource allocation information performed respectively by an RS and an MS at a second time slot in a nontransparent relay plus sliding MAP mode according to an exemplary embodiment of the present invention.
Figure 18B:
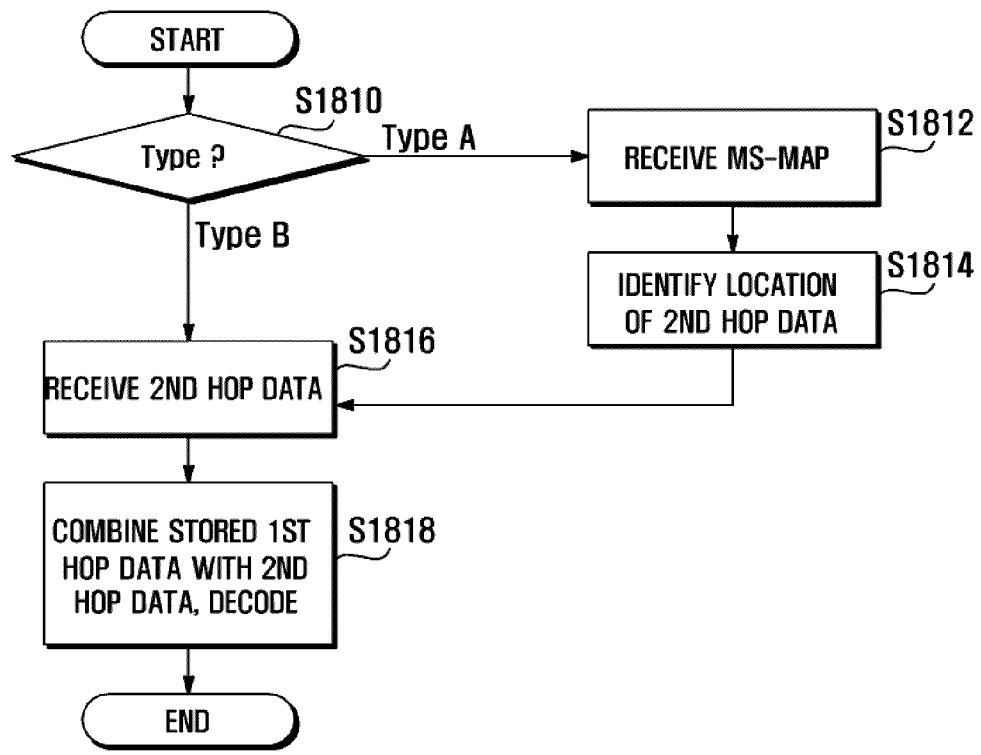

FIGS. 18A and 18B are flowcharts illustrating procedures for processing resource allocation information performed respectively by an RS 120 and an MS 130 at a second time slot in a nontransparent relay plus sliding MAP mode according to an exemplary embodiment of the present invention.

FIG. 18A is a flowchart illustrating a procedure for an RS 120 at a second time slot in a nontransparent relay plus sliding MAP mode according to an exemplary embodiment of the present invention.

Referring to FIG. 18A, the RS 120 determines the type of the scheme for transmitting resource allocation information in step S1802.

If it is determined that the scheme is type A, the RS 120 transmits an MS MAP 1430 containing information on the MS data zone 1440 by allocating the MS MAP 1430 in the second hop RS frame in step S1804. The RS 120 transmits second hop MS data (re-encoded at the first time slot) by inserting the second hop MS data in the MS data zone of the second hop RS frame.

In contrast, if it is determined that the scheme is type B, the RS 120 transmits second hop MS data (re-encoded at the first time slot) by inserting the second hop MS data in the MS data zone of the second hop RS frame in step S1806. In this case, the RS 120 has already transmitted a simultaneous assignment MS MAP containing both first hop MS data zone information and second hop MS data zone information to the MS 130. Hence, the RS 120 does not have to transmit additional resource allocation information to the MS 130 at the second time slot.

FIG. 18B is a flowchart illustrating a procedure for an MS 130 at a second time slot in a nontransparent relay plus sliding MAP mode according to an exemplary embodiment of the present invention.

Referring to FIG. 18B, the MS 130 determines the type of the scheme for transmitting resource allocation information in step S1810.

If it is determined that the scheme is type A, the MS 130 receives a second hop RS frame from the RS 120 in step S1812, and obtains second hop MS data zone information by checking the separate MS MAP 1430 in the second hop RS frame in step S814. The MS 130 receives second hop MS data in the identified MS data zone in step S1816. Finally, the MS 130 combines the first hop MS data obtained at the first time slot and the second hop MS data obtained at the second time slot together, and decodes the combined MS data in step S1818.

In contrast, if it is determined that the scheme is type B, the MS 130 has already obtained information regarding the second hop MS data zone through the simultaneous assignment MS MAP 1520 received at the first time slot. Hence, the MS 130 does not have to receive additional resource allocation information. For the type B scheme, the MS 130 immediately receives second hop MS data in the identified MS data zone in step S1816. Finally, the MS 130 combines the first hop MS data obtained at the first time slot with the second hop MS data obtained at the second time slot, and decodes the combined MS data in step S1818.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A cooperative relay method in a multi-hop relay network, the method comprising:
   receiving, at a first time slot, resource allocation information from a base station, and identifying a first hop Mobile Station (MS) data zone;
   receiving, at the first time slot, first hop MS data in the identified first hop MS data zone, and storing the received first hop MS data; and
   receiving, at a second time slot, second hop MS data from a relay station, and combining the first hop MS data with the second hop MS data.

2. The method of claim 1, wherein the resource allocation information comprises an MS MAP indicating a first hop MS data zone.

3. The method of claim 1, wherein the resource allocation information comprises a simultaneous assignment MS MAP indicating both a first hop MS data zone and a second hop MS data zone.

4. The method of claim 1, wherein the resource allocation information comprises a relay MAP indicating a first hop MS data zone.

5. A cooperative relay method in a multi-hop relay network, the method comprising:
   receiving, at a first time slot, a first hop Base Station (BS) frame from a base station, and storing the received first hop BS frame;
   receiving, at a second time slot, resource allocation information from a relay station, and identifying a data zone;
   obtaining, at the second time slot, first hop Mobile Station (MS) data in the identified data zone of the stored first hop BS frame; and
   receiving, at the second time slot, second hop MS data from the relay station, and combining the first hop MS data with the second hop MS data.

6. The method of claim 5, wherein the resource allocation information comprises an MS MAP indicating a first hop MS data zone of the first hop BS frame.

7. The method of claim 5, wherein the resource allocation information comprises a simultaneous assignment MS MAP indicating both a first hop MS data zone and a second hop MS data zone.

8. A cooperative relay method in a multi-hop relay network, the method comprising:
   receiving, by a relay station at a zeroth time slot, a relay MAP containing information as to a first hop MS data zone from a base station;
   examining, by the relay station at a first time slot, the information as to the first hop Mobile Station (MS) data zone, and transmitting resource allocation information as to first hop MS data to a mobile station;
   identifying, by the mobile station at the first time slot, the first hop MS data zone on the basis of the resource allocation information from the relay station;
   receiving, by the mobile station at the first time slot, the first hop MS data in the identified first hop MS data zone, and storing the received first hop MS data; and receiving, by the mobile station at a second time slot, second hop MS data from the relay station, and combining the first hop MS data with the second hop MS data.

9. The method of claim 8, wherein the resource allocation information comprises an MS MAP indicating a first hop MS data zone.

10. The method of claim 8, wherein the resource allocation information comprises a simultaneous assignment MS MAP indicating both a first hop MS data zone and a second hop MS data zone.

* * * * *